United States Patent [19]

Taguchi et al.

[11] Patent Number: 5,748,808
[45] Date of Patent: May 5, 1998

[54] IMAGE REPRODUCING METHOD AND APPARATUS CAPABLE OF STORING AND REPRODUCING HANDWRITING

[75] Inventors: Toshio Taguchi; Kiyoshi Agusa, both of Kyoto; Shin-ichiro Yamamoto, Nagoya; Hiroki Nakamura, Kyoto, all of Japan

[73] Assignee: Yashima Electric Co., Ltd., Kyoto, Japan

[21] Appl. No.: 354,130

[22] Filed: Dec. 6, 1994

[51] Int. Cl.$^6$ .................................................. G06K 9/20
[52] U.S. Cl. ............................................................ 382/312
[58] Field of Search ................................. 382/177, 178, 382/179, 187, 188, 202, 312, 313, 314, 315, 316

[56] References Cited

U.S. PATENT DOCUMENTS

| | | | |
|---|---|---|---|
| Re. 34,476 | 12/1993 | Norwood | 382/187 |
| 3,111,646 | 11/1963 | Harmon | 382/294 |
| 3,930,228 | 12/1975 | Spanjersberg | 382/178 |
| 4,024,500 | 5/1977 | Herbst et al. | 382/178 |
| 4,475,240 | 10/1984 | Brogardh et al. | 385/313 |
| 4,644,582 | 2/1987 | Morishita et al. | 382/294 |
| 4,731,857 | 3/1988 | Tappert | 382/178 |
| 4,943,868 | 7/1990 | Yoshinaga et al. | 358/403 |
| 5,150,295 | 9/1992 | Mattingly | 364/420 |
| 5,251,271 | 10/1993 | Fling | 382/294 |
| 5,293,469 | 3/1994 | Outa et al. | 382/294 |
| 5,294,792 | 3/1994 | Lewis | 250/281 |
| 5,321,768 | 6/1994 | Fenrich et al. | 382/178 |
| 5,465,163 | 11/1995 | Yoshihara et al. | 358/444 |
| 5,517,578 | 5/1996 | Altman et al. | 382/178 |
| 5,526,440 | 6/1996 | Sakano et al. | 382/187 |
| 5,550,937 | 8/1996 | Bell et al. | 382/294 |

FOREIGN PATENT DOCUMENTS

| | | |
|---|---|---|
| A-0035036 | 9/1981 | European Pat. Off. . |
| A-3143383 | 9/1982 | European Pat. Off. . |
| A-0094867 | 11/1983 | European Pat. Off. . |
| A-0507269 | 10/1992 | European Pat. Off. . |
| A-0559294 | 9/1993 | European Pat. Off. . |

*Primary Examiner*—Jose L. Couso
*Attorney, Agent, or Firm*—Beveridge, DeGrandi, Weilacher & Young, LLP

[57] ABSTRACT

A handwriting storing and reproducing method which takes small images including a leading edge for writing and stores the small images in a time sequential manner following a movement of a writing device. The method then reads out the stored small images and overlaps a just read out small image to a previously read out small image so as to obtain a partial image when both small images include portions which include partial handwritings coincident to one another. Thereafter, the method overlaps one partial image to another partial image so as to obtain a larger image when both partial images include portions which include partial handwritings coincident to one another.

14 Claims, 21 Drawing Sheets

........... : value of density of points = 1
|||||||||||||| : value of density of points = 2
▭ : value of density of points ≧ 3

Fig. 16
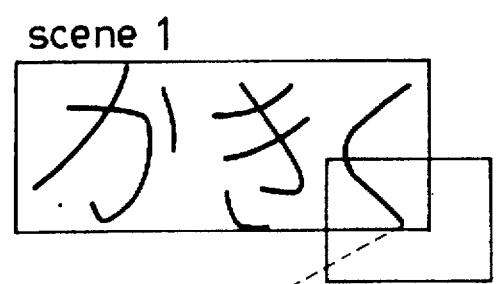
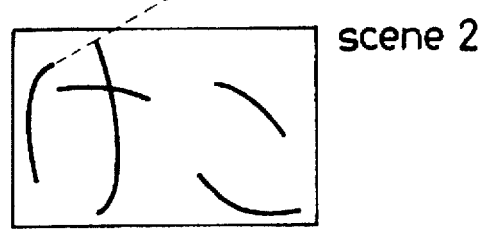
Fig. 17
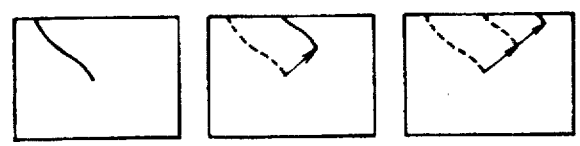

IMAGE REPRODUCING METHOD AND APPARATUS CAPABLE OF STORING AND REPRODUCING HANDWRITING

BACKGROUND OF THE INVENTION

The present invention relates to an image reproducing method which reproduces an image from plural partial images, a handwriting storing and reproducing apparatus and handwriting reproducing methods which store handwriting when characters, symbols and the like are recorded by a writing device on paper or the like, and reproduce the stored handwriting.

In recent years, a writing device for storing handwriting has been proposed. The writing device records characters, symbols and the like on a paper or the like, detects handwriting using stress sensors, optical sensors and the like, and stores the detected handwriting within. The handwriting stored by the writing device can be reused by reading out the handwriting and displaying it on a display device.

On the other hand, a method for measuring acceleration of a writing device, for applying integration twice to the measured acceleration so as to extract a pattern of a handwriting is proposed as a method for extracting and reproducing a pattern of a handwritten character.

In this method, a disadvantage arises in that the method is greatly influenced by an error so that a reproduction of the handwriting with high accuracy is difficult because the integration is performed twice. Further, when a handwriting detection apparatus employs stress sensors and the like, no disadvantage arises when the writing device is kept in contact with a paper or the like. But, when the writing device moves away from the paper and then moves to contact the paper for writing another character for example, a disadvantage arises in that the moving distance, relative position of the next character and the like are difficult to detect. Furthermore, when a handwriting detection apparatus employs optical sensors such as a CCD (charge-coupled device) camera or the like, the handwriting apparatus stores the handwriting by taking an image on a paper at predetermined sampling intervals. The image corresponds to a vicinal region of the writing device and includes a partial pattern of the handwriting (the image is referred to as a small image, hereinafter). A disadvantage arises in that an image similar to the handwritten pattern cannot be reproduced even when the sequential small images are read out as they are, and are displayed on a display device.

It is an object of the present invention to reproduce a larger image from plural small images.

It is another object of the present invention to detect and sequentially store small images, each of which is a part of a handwriting.

It is a further object of the present invention to reproduce a handwriting from plural small images.

It is a yet another object of the present invention to reproduce a handwriting with high accuracy.

SUMMARY OF THE INVENTION

An image reproducing method for reproducing a large image from plural small images which are sequentially stored in a storing device, the method comprises the steps of;

sequentially reading out the small images from he storing device, comparing a just read out small image with a previously read out small image so as to obtain a portion in the just read out small image which is coincident with a portion in the previously read out small image, overlapping the just read out small image to the previously read out small image in a condition that the portion in the just read out small image is exactly overlapped to the portion in the previously read out small image, so as to obtain a new image and to determine the new image as the previously read out small image, repeating the comparing step and the overlapping step in response to the sequentially reading out of the small image.

An image reproducing method for reproducing a large image from plural small images which are sequentially stored in a storing device, the method comprises the steps of;

sequentially reading out the small images from the storing device, comparing a just read out small image with a previously read out small image so as to obtain a portion in the just read out small image which is coincident with a portion in the previously read out small image, overlapping the just read out small image to the previously read out small image in a condition that the portion in the just read out small image is exactly overlapped to the portion in the previously read out small image, so as to obtain a new image and to determine the new image as the previously read out small image, repeating the comparing step and the overlapping step in response to the sequentially reading out step, comparing the new image with a previously obtained new image so as to obtain a portion in the new image which is coincident with a portion in the previously obtained new image, overlapping the new image to the previously obtained new image in a condition that the portion in the new image is exactly overlapped to the portion in the previously obtained new image, so as to obtain a large image.

A handwriting storing and reproducing apparatus comprises;

writing device means for storing handwriting, which device includes a writing section for writing the handwriting on a medium for recording, an optical handwriting detection means for taking images at a predetermined interval in a vicinity of the writing section on the medium and for sequentially detecting a small image within a predetermined region which includes the writing section, and a storing means for sequentially storing the detected small images, reading out means for sequentially reading out the small images from the storing means, comparing means for comparing a just read out small image with a previously read out small image, and for judging whether or not both small images include partial handwritings which are coincident to one another, and image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and for repeating the overlapping at every reading out of a small image.

As to the handwriting storing and reproducing apparatus, when a user writes characters, symbols or the like using the writing section of the writing device means on a paper or the like, small images of the papers are detected by the optical handwriting detection means at predetermined intervals, each of the small images including a handwriting in a vicinal area of a leading edge of the writing section, and the small images are sequentially stored by the storing means. When the handwriting is to be reproduced, the small images which are stored in a time sequential manner are sequentially read out. The just read out small image is compared with the previously read out image so as to obtain portions of each which include partial handwritings which are coincident to one another. The just read out small image is overlapped to the previously read out small image in a condition that the partial handwriting in the just read out small image is exactly overlapped to the partial handwriting in the previously read out small image so as to obtain a new image which is larger than the small image. Therefore, a handwriting is reproduced even when the handwriting includes non-continuing portions (the non-continuing portions are generated by moving the writing section apart from the paper) and the reproduced is similar to the originally written handwriting.

A handwriting storing and reproducing apparatus comprises;

writing device means for storing handwriting, which device includes a writing section for writing the handwriting on a medium for recording, an optical handwriting detection means for taking an image at a predetermined interval in a vicinity of the writing section on the medium and for sequentially detecting a small image within a predetermined region which includes the writing section, and a storing means for sequentially storing the detected small images, reading out means for sequentially reading out the small images from the storing means, comparing means for comparing a just read out small image with a previously read out small image, and for judging whether or not both small images include partial handwritings which are coincident to one another, first image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and for repeating the overlapping at every reading out of a small image so as to reproduce a partial image which is larger than the small image, when the comparing means judges that both small images include partial handwritings which are coincident to one another, and second image processing means for overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, and for repeating the overlapping at every reading out of a small image so as to reproduce another partial image which is larger than the small image.

A handwriting storing and reproducing apparatus comprises;

writing device means for storing handwriting, which device includes a writing section for writing the handwriting on a medium for recording, an optical handwriting detection means for taking images at a predetermined time interval in a vicinity of the writing section on the medium and for sequentially detecting a small image within a predetermined region which includes the writing section, and a storing means for sequentially storing the detected small images, reading out means for sequentially reading out the small images from the storing means, first comparing means for comparing a just read out small image with a previously read out small image, and for judging whether or not both small images include partial handwritings which are coincident to one another, first image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include partial handwritings which are coincident to one another, and for repeating the overlapping at every reading out of a small image so as to reproduce a partial image which is larger than the small image, when the first comparing means judges that both small images include partial handwritings which are coincident to one another, second image processing means for overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, and for repeating the overlapping at every reading out of a small image so as to reproduce another partial image which is larger than the small image, after the first comparing means has judged that both small images do not include partial handwritings which are coincident to one another, second comparing means for comparing one of the partial images with another partial image, and for judging whether or not both partial images include partial handwritings which are coincident to one another, and third image processing means for overlapping the one of the partial images to the another partial image in a condition that a partial handwriting in the one of the partial images is exactly overlapped to a partial handwriting in the another partial image, so as to obtain a larger image and to determine the larger image as the another partial image, when both partial images include the partial handwritings which are coincident to one another.

A handwriting storing and reproducing apparatus comprises;

a writing section for writing the handwriting on a medium for recording, optical handwriting detection means for taking images at a predetermined interval in a vicinity of the writing section on the medium and for sequentially detecting small images within a predetermined region which includes the writing section, storing means for sequentially storing the detected small images, reading out means for sequentially reading out the small images from the storing means, first comparing means for comparing a just read out small image with a previously read out small image, and for judging whether or not both small images include partial handwritings which are coincident to one another, first image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include partial handwritings which are coincident to one another, and for repeating the overlapping at every reading out of a small image so as to reproduce a partial image which is larger than the small image, when the first comparing means judges that both small images include partial handwritings which are coincident to one another, second image processing means for overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, and for repeating the overlapping at every reading out of a small image so as to reproduce another partial image which is larger than the small image, after the first comparing means has judged that both small images do not include partial handwritings which are coincident to one another, second comparing means for comparing one of the partial images with another partial image, and for judging whether or not both partial images include partial handwritings which are coincident to one another, and third image processing means for overlapping the one of the partial images to the another partial image in a condition that a partial handwriting in the one of the partial images is exactly overlapped to a partial handwriting in the another partial image, so as to obtain a larger image and to determine the larger image as the another partial image, when both partial images include the partial handwritings which are coincident to one another.

A handwriting storing and reproducing apparatus comprises;

a writing section for writing the handwriting on a medium for recording, handwriting storing means for storing handwriting, which includes an optical handwriting detection means for optically detecting small images within a predetermined region in a time sequential manner, and a storing means for sequentially storing the detected small images, reading out means for sequentially reading out the small images from the storing means, first comparing means for comparing a just read out small image with a previously read out small image, and for judging whether or not both small images include partial handwritings which are coincident to one another, first image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and for repeating the overlapping at every reading out of a small image so as to reproduce a partial image which is larger than the small image, when the first comparing means judges that both small images include partial handwritings which are coincident to one another, second image processing means for overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, and for repeating the overlapping at every reading out of a small image so as to reproduce another partial image which is larger than the small image, after the first comparing means has judged that both small images do not include partial handwritings which are coincident to one another, second comparing means for comparing one of the partial images with another partial image, and for judging whether or not both partial images include partial handwritings which are coincident to one another, and third image processing means for overlapping the one of the partial images to the another partial image in a condition that a partial handwriting in the one of the partial images is exactly overlapped to a partial handwriting in the another partial image, so as to obtain a larger image and to determine the larger image as the another partial image, when both partial images include the partial handwritings which are coincident to one another.

A handwriting storing and reproducing apparatus comprises;

writing device means for storing handwriting, which device includes a writing section for writing the handwriting on a medium for recording, an optical handwriting detection means for optically detecting small images within a predetermined region in a time sequential manner, and a storing means for sequentially storing the detected small images, reading out means for sequentially reading out the small images from the storing means, first comparing means for comparing a just read out small image with a previously read out small image, and for judging whether or not both small images include partial handwritings which are coincident to one another, first image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and for repeating the overlapping at every reading out of a small image so as to reproduce a partial image which is larger than the small image, when the first comparing means judges that both small images include partial handwritings which are coincident to one another, second image processing means for overlapping the just read out small image to another previously read out small image in a condition that a portion of handwriting in the just read out small image is exactly overlapped to a partial handwriting in the previously read out small image, so as to obtain another new image and to determine the another new image as the another previously read out small image, when both small images include partial handwritings which are coincident to one another, and for repeating the overlapping at every reading out of a small image so as to reproduce another partial image which is larger than the small image, after the first comparing means has judged that both small images do not include partial handwritings which are coincident to one another, second comparing means for comparing one of the partial image with another partial image, and for judging whether or not both partial images include partial handwritings which are coincident to one another, and third image processing means for overlapping the one of the partial images to the another partial image in a condition that a partial handwriting in the one of the partial images is exactly overlapped to a partial handwriting in the another partial image, so as to obtain a larger image and to determine the larger image as the another partial image, when both partial images include the partial handwritings which are coincident to one another.

A handwriting reproducing method which reproduces the handwriting of a writing device means which records the handwriting with a writing section thereof on a surface of a medium, takes a small image of a vicinal region with respect to the writing section with an image-pickup means thereof in a time sequential manner following a movement of the writing section, which image-pickup means is housed within a main body of the writing device means, and stores the small images sequentially, the method comprises the steps of;

reading out the small images sequentially, comparing a just read out small image with a previously read out small image, judging whether or not both small image include partial handwritings which are coincident to one another, overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and repeating the overlapping at every reading out of a small image.

A handwriting reproducing method which reproduces the handwriting of a writing device means which records the handwriting with a writing section thereof on a surface of a medium, takes small images of a vicinal region of the writing section with an image-pickup means thereof in a time sequential manner following a movement of the writing section which image-pickup means is housed within a main body of the writing device means, and stores the small images sequentially, the method comprises the steps of:

reading out the small images sequentially, comparing a just read out small image with a previously read out small image, judging whether or not both small image include partial handwritings which are coincident to one another, overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, repeating the overlapping when it is judged that both small images include partial handwritings which are coincident to one another, overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, and repeating the second overlapping at every reading out of a small image so as to reproduce another partial image which is larger than the small image, after it is judged that both small images do not include partial handwritings which are coincident to one another.

A handwriting reproducing method which reproduces the handwriting of a writing device means which records the handwriting with a writing section thereof on a surface of a medium, takes small images of a vicinal region of the writing section with an image-pickup means thereof in a time sequential manner following a movement of the writing section which image-pickup means is housed within a main body of the writing device means, and stores the small images sequentially, the method comprises the steps of;

reading out the small images sequentially, comparing a just read out small image with a previously read out small image, judging whether or not both small images include partial handwritings which are coincident to one another, overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, repeating the overlapping at every reading out of a small image so as to reproduce a partial image which is larger than the small image, when the comparing means judges that both small images include portions of handwriting which are coincident to one another, overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, repeating the second overlapping at every reading out of a small image so as to reproduce another partial image which is larger than the small image, after it has judged that both small images do not include partial handwritings which are coincident to one another, comparing one of the partial images with another partial image, judging whether or not both partial images include partial handwritings which are coincident to one another, and overlapping the one of the partial images to the another partial image in a condition that a partial handwriting in the one of the partial images is exactly overlapped to a partial handwriting in the another partial image, so as to obtain a larger image and to determine the larger image as the another partial image, when both partial images include the partial handwritings which are coincident to one another.

A handwriting reproducing method which reproduces the handwriting of a writing device means which records the handwriting with a writing section thereof on a surface of a medium, takes a cell which comprises a fixed number of picture elements representing a vicinal region of the writing section with an image-pickup means thereof in a time sequential manner following a movement of the writing section which image-pickup means is housed within a main body of the writing device means, and stores the small images sequentially, the method comprises the steps of;

reading out the cells sequentially, comparing a just read out cell with a previously read out cell, judging whether or not both cells include partial handwritings which are coincident to one another, overlapping the just read out cell to the previously read out cell in a condition that a partial handwriting in the just read out cell is exactly overlapped to a partial handwriting in the previously read out cell, so as to obtain an new image and to determine the new image as the previously read out cell, when both cells include partial handwritings which are coincident to one another, repeating the overlapping at every reading out of a cell so as to reproduce a new image which is larger than the cell, when it is judged that both cells include partial handwritings which are coincident to one another, determining the new image as an act when it is judged that both cells do not include partial handwritings which are coincident to one another, overlapping the just read out cell to another previously read out cell in a condition that a partial handwriting in the just read out cell is exactly overlapped to a partial handwriting in the previously read out cell, so as to obtain another new image and to determine the another new image as the another previously read out cell, when both cells include the partial handwritings which are coincident to one another, repeating the second overlapping at every reading out of a cell so as to reproduce another new image which is larger than the cell, after it has judged that both cells do not include partial handwritings which are coincident to one another, determining the another new image as another act when it is judged that both cells do not include partial handwritings which are coincident to one another, comparing one of the acts with another act, judging whether or not both acts include partial handwritings which are coincident to one another, and overlapping the one of the acts to the another act in a condition that a partial handwriting in the one of the acts is exactly overlapped to a partial handwriting in the another act, so as to obtain a larger image and to determine the larger image as a scene, when both acts include the partial handwritings which are coincident to one another.

It is preferable that the handwriting reproducing method judges whether or not the just read out cell and the previously read out cell include partial handwritings which are coincident with one another, by moving the just read out cell upward, downward, rightward or leftward within an extent of one M-th (where M is a real number and is equal or greater than 1) of the width and height of the just read out cell so as to obtain correlation between the both cells.

It is also preferable that the handwriting reproducing method judges whether or not the one of the acts and the another act include partial handwritings which are coincident with one another, by moving the one of the acts upward, downward, rightward or leftward within an extent of one N-th (where N is a real number and is equal or greater than 1) of the width and height of the one of the acts so as to obtain correlation between the both acts.

BRIEF DESCRIPTION OF THE DRAWINGS

FIG. 16 is a diagram useful in understanding obtaining of a positional relationship between two scenes;

FIG. 17 is a diagram useful in understanding obtaining of a moving direction and a moving speed;

DETAILED DESCRIPTION OF THE PREFERRED EMBODIMENTS

Hereinafter, referring the attached drawings, we explain the present invention in detail.

Figure 1:
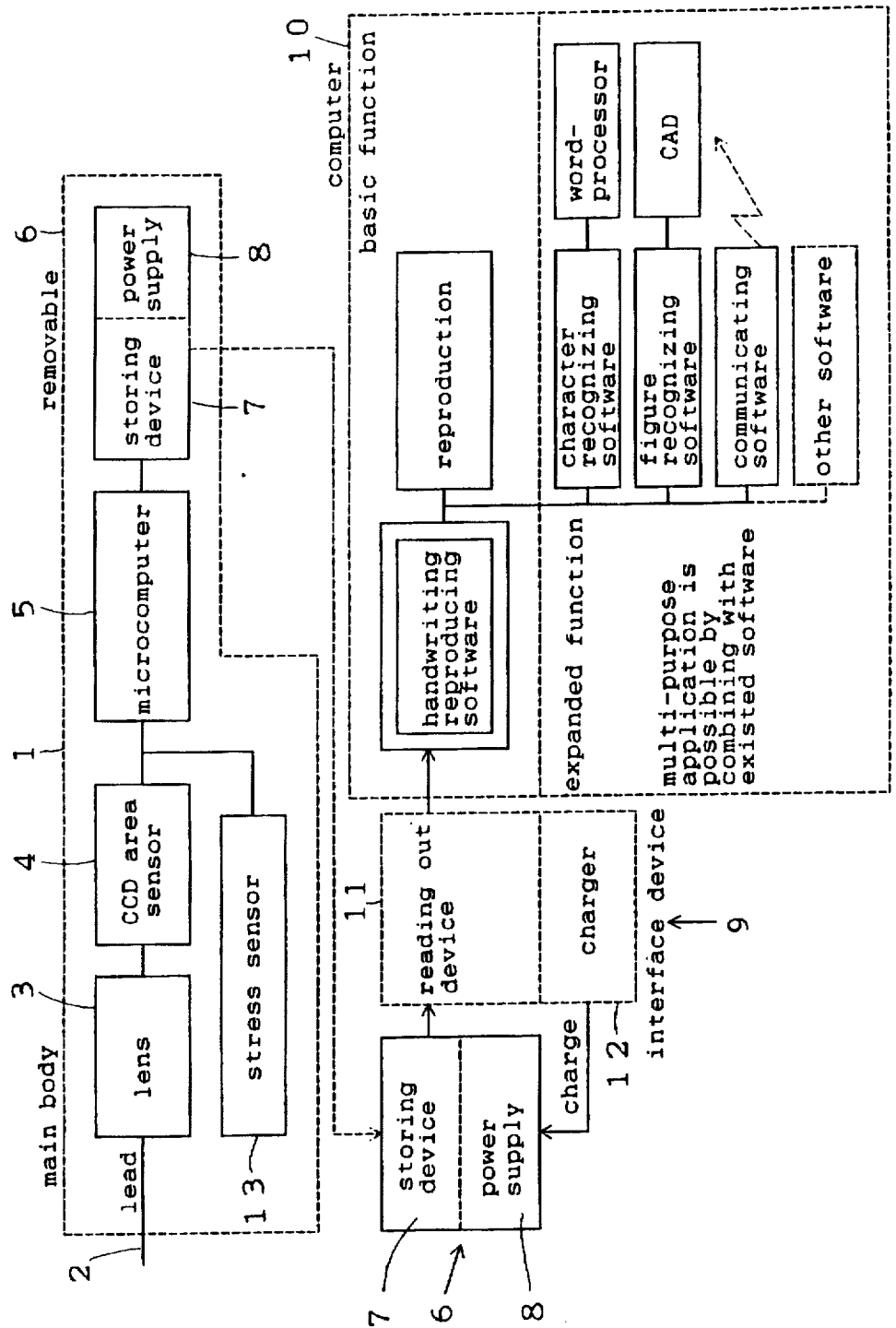
FIG. 1 is a block diagram illustrating an arrangement of a handwriting storing and reproducing apparatus of an embodiment according to the present invention.

FIG. 1 is a block diagram illustrating an arrangement of a handwriting storing and reproducing apparatus according to one embodiment of the present invention.

The handwriting storing and reproducing apparatus includes a writing devise 1 for detecting and storing handwriting, an interface device 9, and a computer 10 which reads out handwriting data from the writing device 1 through the interface device 9 and reproduces the handwriting.

The writing device 1 for storing handwriting includes a lead 2 for writing something on a paper or the like, such as a lead of a ball point pen or the like, a lens 3, a CCD (charge coupled device) area sensor 4, a microcomputer 5, a storing device 7, a power supply (battery) 8 and a stress sensor 13 for detecting contact or non-contact of the lead 2 with the paper. A unit 6 comprising the storing device 7 and the power supply 8 is provided to a main body of the writing device 1 in a removable manner.

When the unit 6 is removed from the main body of the writing device 1 and is connected to the interface device 9, handwriting data stored in the storing device 7 is taken into the computer 10 through a reading out device 11, which is a part of the interface device 9. At the same time, a battery of the power supply 8 is charged by a charger 12, which is also a part of the interface device 9.

The writing device 1 may be separated into parts. One part includes a lead 2 and a lead holding member, and the other part includes other components in one body. And, the other part is attached to the one part in a removable manner.

The computer 10 includes software (program) for reproducing a handwriting based upon the taken data representing the handwriting, a handwriting reproducing function as a basic function, a character recognizing software, a figure recognizing software, a communicating software, a character recognizing function, a figure recognizing function, a communicating function and the like. The handwriting reproducing function is described later, and is one of the most important functions in the present invention among those functions listed above. Each software is employed for performing the corresponding function.

Figure 2:
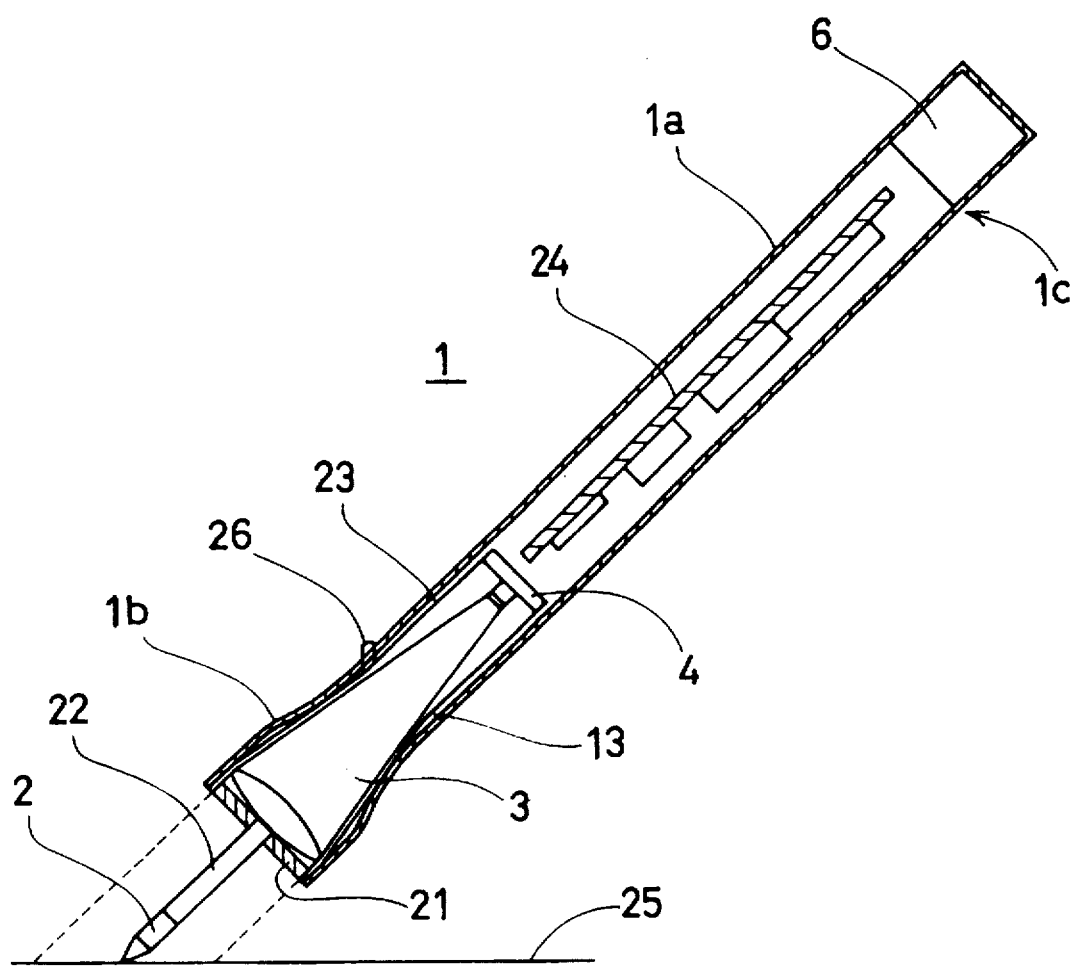
FIG. 2 is a cross sectional view of a writing device for storing handwriting which is used in the handwriting storing and reproducing apparatus.

FIG. 2 is a cross sectional view of a writing device for storing handwriting data which is used in the handwriting storing and reproducing apparatus.

The writing device 1 for storing handwriting data has a pencil-shaped form and has a column-shaped case body 1a. The leading edge portion 1b of the case body 1a is enlarged in diameter to some degree. A transparent lead holding plate 21 is provided at the leading edge portion 1b of the case body 1a. A lead holder 22 for holding the lead 2 projects from the center of the lead holding plate 21. The lead holding plate 21, the lead 2 and the lead holder 22 constitute the writing section.

A telecentric lens 3 as a telecentric system is disposed at an inner position of the writing device 1 with respect to the lead holding plate 21. A CCD area sensor (handwriting detection means) 4 is disposed at a neighbouring position of the inner edge portion of the telecentric lens 3. Though the telecentric lens 3 is drawn in FIG. 2 with the shape illustrated in the figure, this shape does not express the shape of the lens but instead expresses the light path schematically. In this embodiment, an optical axis of the telecentric lens 3 is coincident with the central axes of the lead 2 and lead holder 21 (and a central axis of the case body 1a). The CCD area sensor 4 is disposed on the optical axis. However, the optical axis of the telecentric lens 3 and the central axis of the writing section need not necessarily be coincident with one another. The optical axis of the telecentric lens 3 and the central axis of the writing section may be shifted relative to one another when the leading edge of the lead 2 (that is, a just written point of a handwriting which is being written) is located within the field of view for optical detection by the CCD area sensor 4 and the just written point is detected.

As is understood from FIG. 2, the lead holding plate 21, the lead 2, the lead holder 22, the telecentric lens 3 and the CCD area sensor 4 are fixed in one body in an inner case 23. The inner case 23 is lightly slidable along a direction parallel to the optical axis and toward the inner side of the case body 1a by writing pressure. When the inner case 23 slides in a direction which is parallel to the optical axis and moves toward the inner side of the case body 1a from writing pressure, the stress sensor 13 is pressed by the inner case 23 and it detects that writing is being carried out. The stress sensor 13 can also be constructed to detect that writing is being carried out based upon bending of the inner case 23 in a vertical direction (radial direction) with respect to the optical axis.

A printed circuit board 24 on which electrical circuitry including LSI (large scale integration) and the like is disposed is also located within the case body 1a. The CCD area sensor 4 is connected to the electrical circuitry, and detected handwriting data which is detected by the CCD area sensor 4 and/or the stress sensor 13 is taken by the electrical circuitry. A unit 6 which houses the storing device 7 for storing the detected handwriting data and a battery is provided in the rear portion 1c of the case body 1a.

As noted before, a sensor (stress sensor) 13 for detecting a condition that writing is being carried out is provided between the inner case 23 and the inner wall of the case body 1a. The stress sensor 13 is pressed by the inner case 23 so that the condition that writing is being carried out is detected by the pressing force, when the inner case 23 is slightly moved to the inner side of the case body 1a by the writing force, as was described earlier. That is, the signal output from the stress sensor 13 can be used for judging whether or not the lead 2 contacts the paper. A start switch 26 is provided at a portion of the case body 1a which is located outward of the stress sensor 13. The power supply for the writing device 1 is controlled in an ON/OFF manner by operating the start switch 26.

When the writing device 1 is used, the start switch 26 is pressed so as to turn on the power supply. The writing device user then grasp and inclines the case body 1a with respect to the paper 25 (as is illustrated in FIG. 2) and writes characters, figures or the like. The inclined condition is the ordinary writing condition. The inner case 23 slightly moves into the case body 1a by the writing force, and the stress sensor 13 detects a condition that writing is being carried out. And, the handwriting, that is the image on the paper 25, is received by the telecentric lens 3 as rays which are parallel to the optical axis. The image is transformed into handwriting image data signals by the CCD area sensor 4. One or more data compression methods, such as thinning, are then applied to the handwriting image data signals by the electrical circuitry, and the handwriting data is sequentially stored by the storing device 7. Further, the leading edge of the lead 2 may move apart from the paper 25 and may move three dimensionally during its writing operation, and the detection signal from the sensor 13, indicating whether the leading edge of the lead 2 is moving three dimensionally or is writing on the paper 25, is stored by the storing device 7 simultaneously with the handwriting signal. The detection signal indicating whether the leading edge of the lead 2 is moving three dimensionally or is writing on the paper 25 is used to more easily reproduce the handwriting when the handwriting is being reproduced by the handwriting reproducing software (handwriting reproducing means) in the computer 10 (which is illustrated in FIG. 1).

Next, the handwriting storing operation and the handwriting reproducing operation of the handwriting storing and reproducing apparatus will be described.

Figure 3:
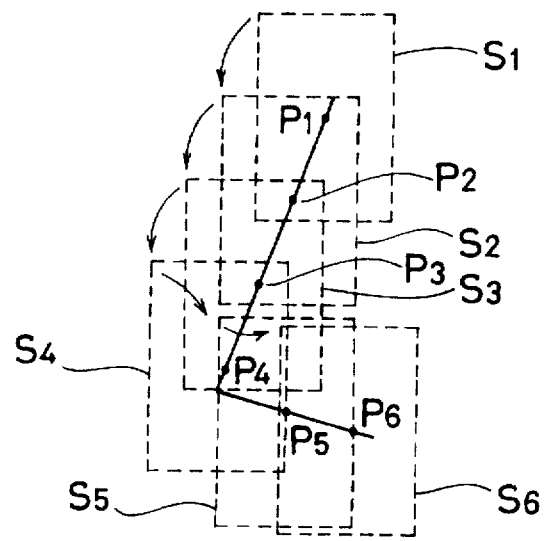
FIG. 3 is a diagram useful in understanding a handwriting detection method by a CCD in the writing device for storing its handwriting.

It is assumed for this explanation that the character "L" is written on the paper 25 using the lead 2 of the writing device 1. During the writing, the CCD area sensor 4 sequentially takes images within the field of view at a constant sampling frequency. It is also assumed, as shown in FIG. 3, that a first line having a gentle inclination is written from an upper position to a leftward lower position, and then a second line having a gentle inclination is written from the leftward lower position to a rightward lower position. It is further assumed that the position of the lead 2 moves from P1, P2, . . . , P6, . . . at every sampling time. The sampling time is determined to be a necessary and sufficient time for reproducing the handwriting. The sampling time may be determined to be a variable time which is varied based upon a writing speed. The writing speed may be calculated by comparing a length of a handwriting in a small image and a length of a handwriting in a previous small image. The writing speed may be detected using a sensor for detecting acceleration (not shown) provided to the writing device 1. The writing speed may be detected by other methods. And, the sampling time for the next small image is varied based upon the calculated or detected writing speed.

Figure 4:
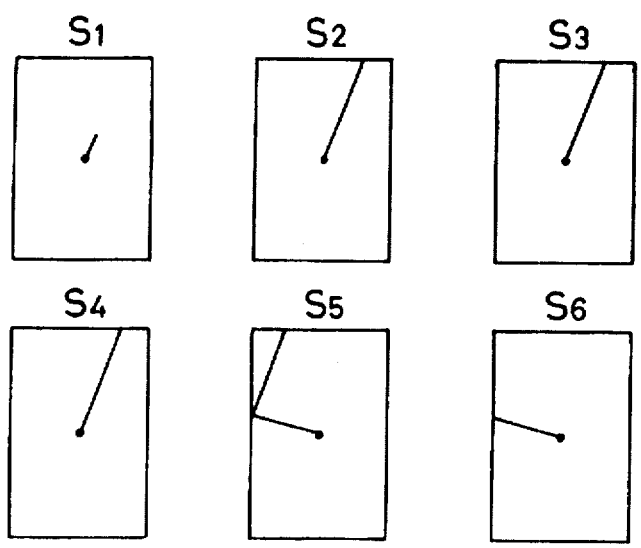
FIG. 4 is a diagram illustrating sample small images which are stored by the writing device for storing handwriting at every sampling interval.

The field of view of the CCD area sensor 4 moves from S1, S2, . . . , S6, . . . . The storing device 7 stores small images defined by S1, S2, . . . , S6, . . . as image data, so the small images will hereinafter be referred to by S1, S2, . . . . S6, . . . . The small images S1, S2, S6, . . . are illustrated in FIG. 4 and have the same size as of the field of view of the CCD area sensor 4. The entire handwriting is stored by storing the small images of constant size continuously during the writing. Further, it is assumed that the writing device 1 never rotates essentially around its axis.

When the handwriting reproducing is carried out, an user hardly recognizes which characters the handwriting are even when the small images illustrated in FIG. 4 are read out and are displayed as they are shown in FIG. 4. A user needs all characters, that is the entire image, written by the writing device 1. Therefore the entire image illustrated in FIG. 3 should be reproduced from the small images illustrated in FIG. 4.

Figure 5:
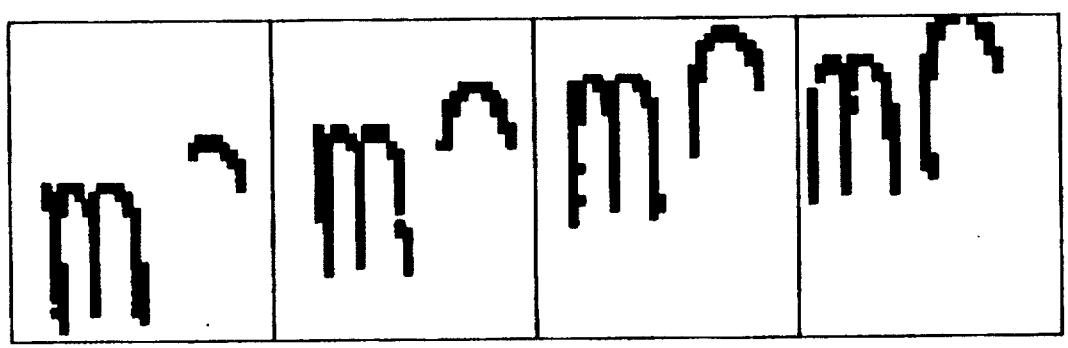
FIG. 5 is a diagram illustrating a specific sample of small images (cells) which are used to reproduce handwriting.

In handwriting reproducing, concepts of "cell", "act", "scene" and "page" are employed and a hierarchical arrangement is constructed. The "cell" is a small image having a fixed number of picture elements, and is the smallest image which is the basis of the handwriting reproducing. S1, S2, . . . , S6, . . . illustrated in FIG. 4 correspond to cells. Another specific example of cells is illustrated in FIG. 5.

The "act" is an image which is constructed by overlapping a series of cells which are sequentially detected over time by the CCD area sensor 4. The series of cells is used to mean a string of cells which is determined as long as possible when a positional relationship between the continuous cells is obtained, that is a positional relationship of a cell with a just prior cell is obtained.

The "scene" is an image which is constructed of plural acts, each of which is obtained based upon its positional relationship to another act. When a positional relationship between one series of cells and another series of cells is not obtained, these series of cells become a part of acts respectively which are different from one another. These series of cells represent a completion in their meaning, respectively, as is described earlier. But, if a positional relationship may be obtained between two acts, such acts are put together as a scene.

A "page" is an image which is constituted by a series of scenes and represents a completion of a writing operation. The scenes are constructed sequentially over time. A scene which constitutes one page includes no portion which is to be over lapped with another scene. Further, partitioning between pages is clearly selected by a user.

In this embodiment, x-y rectangular coordinate systems are employed in the cell, act, scene and page, respectively. Each x-y rectangular coordinate system has a leftmost and uppermost point of the cell, act, scene or page as an origin. And, in each x-y rectangular coordinate system, the x-value increases in a rightward direction and the y-value increases in a downward direction. However, it should be noted that the present invention does not depend upon this coordinate system. Furthermore, a smallest rectangle which surrounds all picture elements represented as black in each image is called as a bounding box (hereinafter referred to as "BB"), and has the smallest size among such rectangles.

Figure 6:
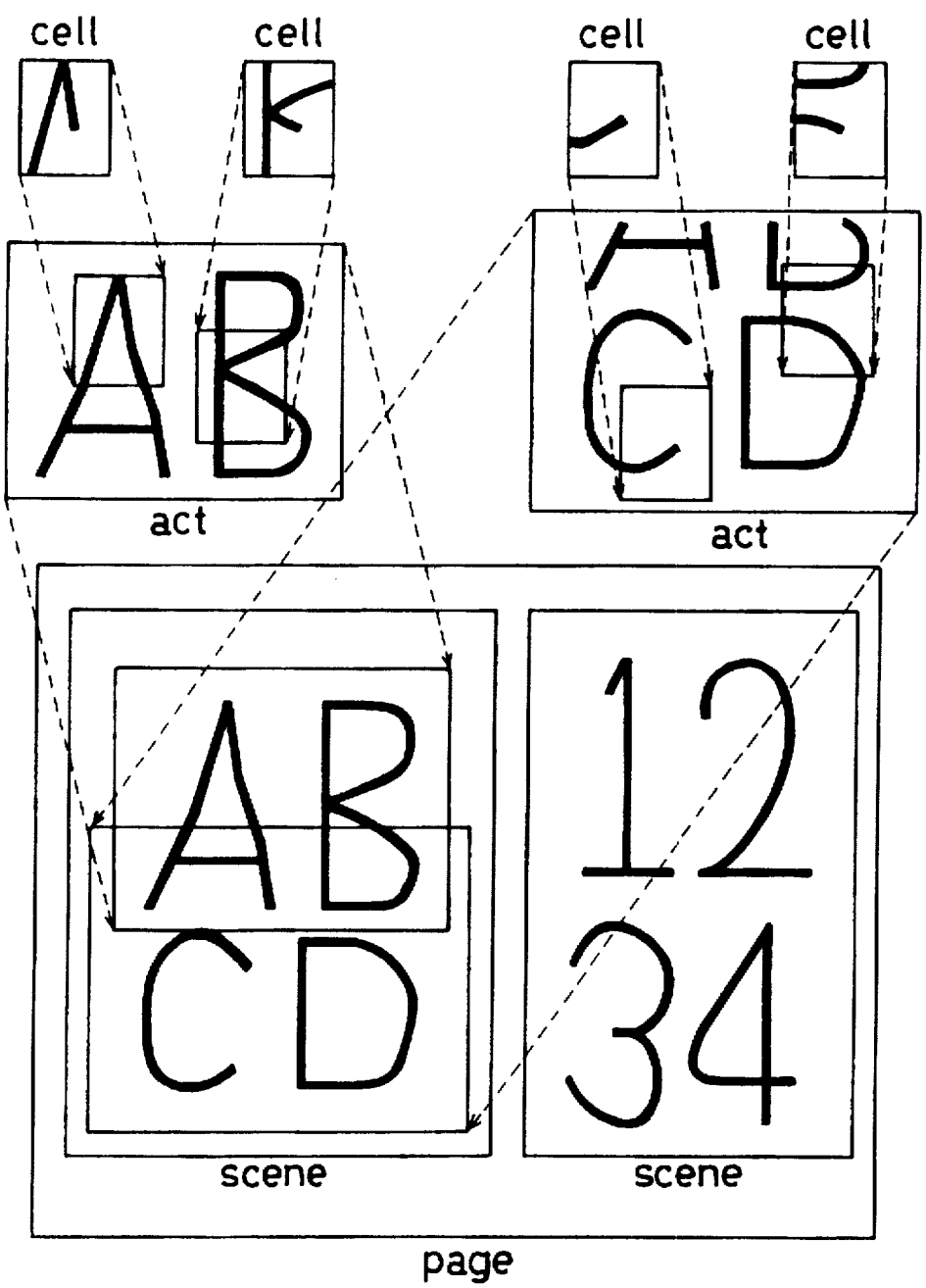
FIG. 6 is a diagram useful in understanding the relationships of cells, acts, scenes and a page which are processed and/or obtained by the handwriting storing and reproducing apparatus.

A picture element constituting a cell is defined as being either BLACK or WHITE corresponding to the strength of the picture element. A method for expanding this black and white definition to a multiple gradation is described later. The strength of a picture element constituting an act, scene or page is an index having a non-negative integer as its value. The non-negative integer represents the probability of the picture element being black. When the value of the index is great, it is represented that the picture element has a great probability to be black. A picture element of no strength (a white pixel) has an index of 0 in an act, scene or page. A specific example representing the relationship of cells, acts, scenes and a page is illustrated in FIG. 6.

Next, we describe the construction of an act.

Initially, an act $act_j$ ($0 \leq j$) is a vacant region (that is, the region includes no black picture elements).

Figure 7:
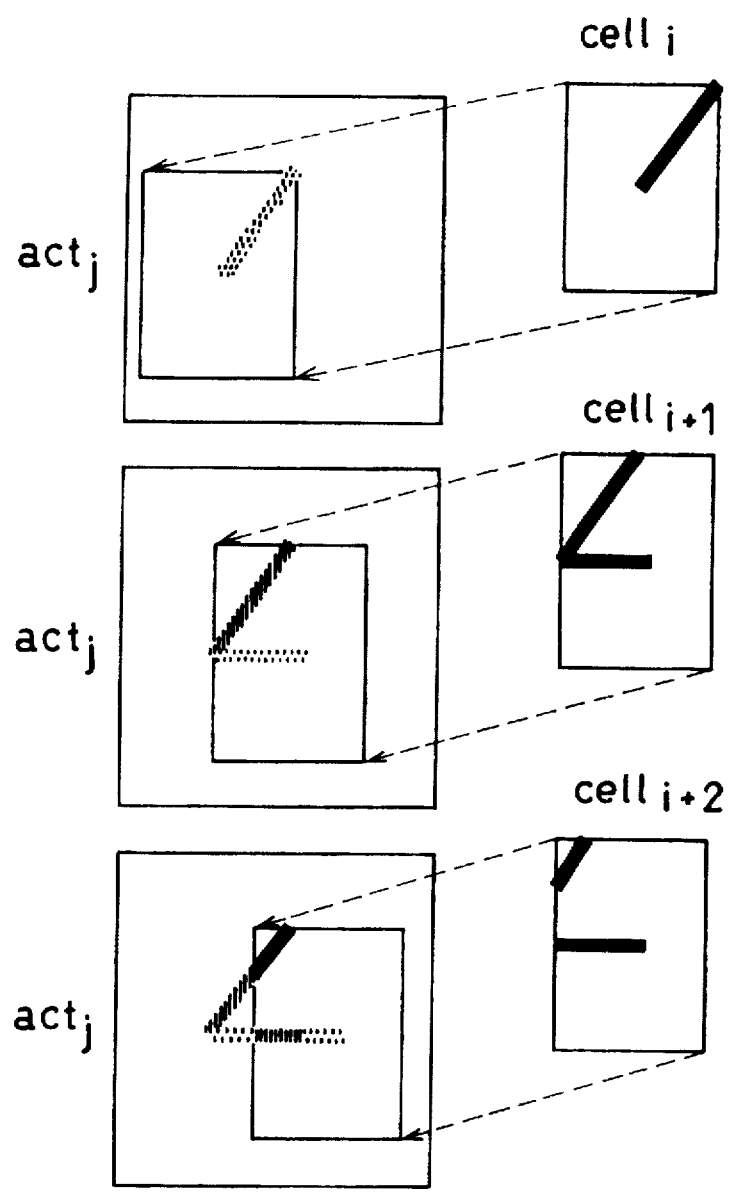
FIG. 7 is a diagram useful in understanding obtaining of an act from cells.
Figure 9:
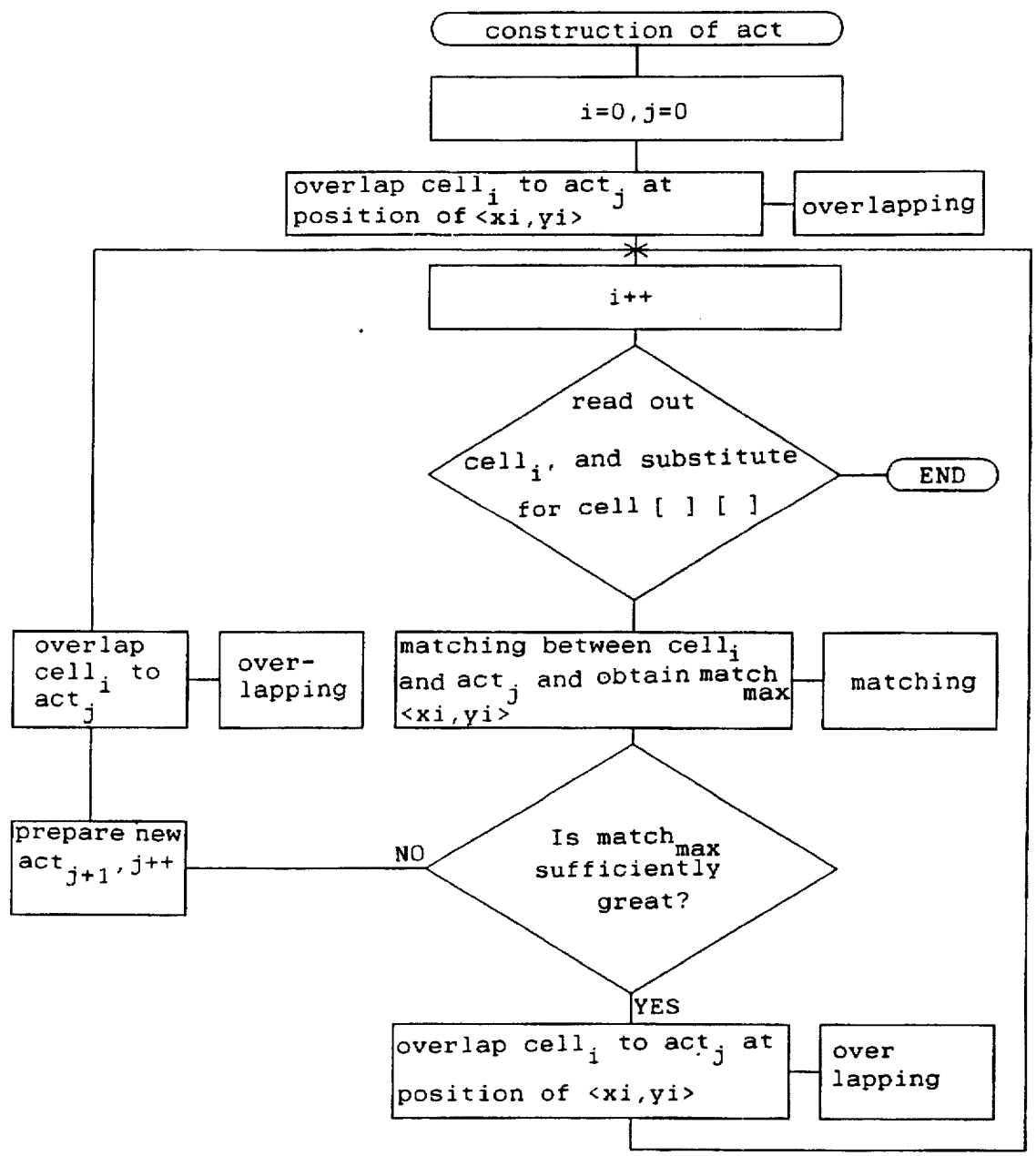
FIG. 9 is a flowchart explaining a procedure of the handwriting storing and reproducing apparatus for obtaining an act.

Constructing an act is performed by overlapping a cell $cell_i$ ($0 \leq i$) to the act $act_j$ in its moderate location. A first cell $cell_0$ is put to an $act_0$ in its proper location. With the next $cell_1$, a partial handwriting appears in the $cell_0$. That is, a partial handwriting already existing in the $act_0$ (hereinafter referred to as a common handwriting), and a new partial handwriting which was written between the taking of the $cell_0$ and the taking of the $cell_1$ appears in $cell_1$. Matching of the handwriting is performed between the cell $cell_1$ and the act $act_0$ so that a position (x1, y1) is obtained at which the common handwriting (i.e., the handwriting common to both the cell $cell_1$ and the act $act_0$) is most consistently overlapped from cell $cell_1$ to the act $act_0$. The cell cell is overlapped at the position (x1, y1) in the act $act_0$. Thereafter, each cell $cell_i$ is overlapped into the $act_0$ at a position (xi, yi) which ensures the common handwriting in each cell $cell_i$ to be most consistently overlapped with the common handwriting of the $act_0$, until a cell $cell_j$ appears with common handwriting of which does not sufficiently overlap the act $act_0$. The series of operations is illustrated in FIG. 7. When the common handwriting of the cell $cell_j$ is insufficiently overlapped to the act $act_j$, a new constructing operation is performed to cells appearing after the cell $cell_j$ by taking a new act $act_{j+1}$ as an object act. A constructing procedure of an act is illustrated in FIG. 9 by a flowchart.

In FIG. 7, lines represented by plural points and having a thin density represent a matching density 1, lines represented by plural points and having a thick density represent a matching density 2, and thick solid lines represent a matching density 3.

A matching method between a cell and an act is described. Hereinafter, cells and acts are represented using the two dimensional arrangements of cell[CELL_WIDTH][CELL_HEIGHT] and act[ACT_WIDTH][ACT_HEIGHT], respectively.

A handwriting matching algorithm between a cell and an act receives a cell and an act and returns a position (x, y) on the act. The cell and the act are most smoothly and accurately overlapped to one another at this position (x, y). The algorithm is described below.

Figure 12:
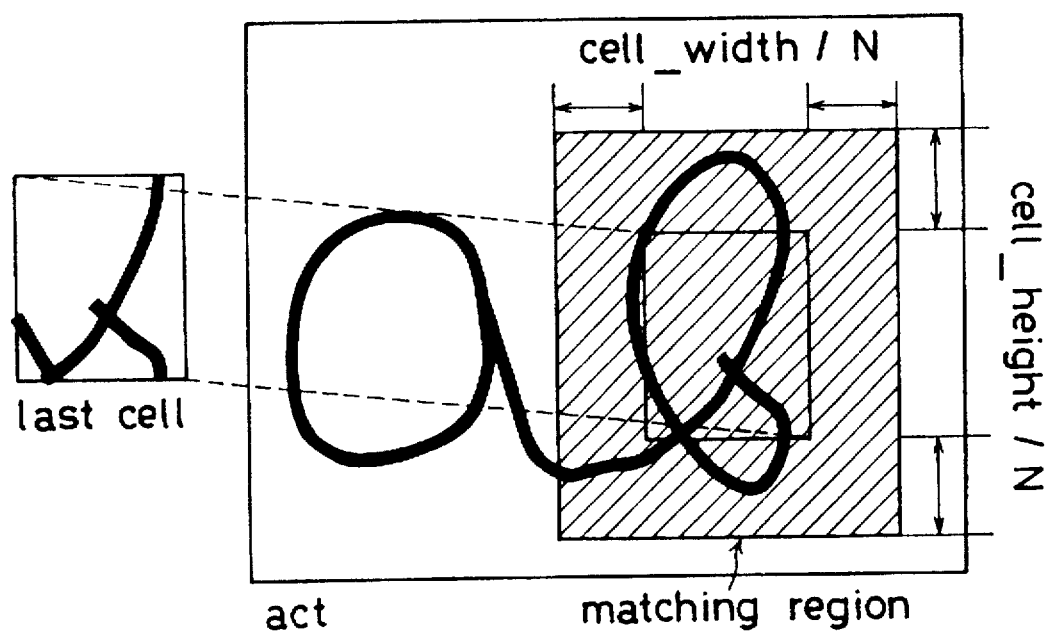
FIG. 12 is a diagram useful in understanding the matching of a cell with an act.

When the sampling frequency of the writing device is sufficiently short, a moving distance of the lead 2 between two cells can be assumed to be small. From this assumption, the common handwriting which is common between the cell and the act is assumed to appear in a region surrounding a coordinate at which a cell just prior to the cell being matched (hereinafter referred to as a just prior cell) is positioned. Therefore, a region for performing matching (hereinafter referred to as a matching region) is determined to be an area of the act which is outward of the just prior cell by one N-th (N is a real number and is equal or greater than 1) of the width and height of the cell. The matching region includes a part or entirety of the just prior cell. That is, the matching region includes the region in which the just prior cell is overlapped to the act. FIG. 12 illustrates the matching region when N is determined to be 2. In FIG. 12, there are two matching regions one of which is a partial region of the act, and the other of which is an entirety of the cell. But, the latter matching region may be a partial region of the cell when the partial region of the cell is overlapped to the edgeward partial region of the act. In this case, the act is expanded in size by overlapping the cell to the act.

The cell is overlapped at positions of predetermined intervals (i.e., at every integral coordinate point) within the matching region and an operation which will be described later is performed, so that a position (x, y) which has the greatest value of matching is determined. The position (x, y) is a position at which the cell and the act most properly match to one another, and that is a position at which the lead 2 is most highly likely to be positioned. A match value is a value representing an accuracy of overlapping of two images. The match value is obtained by the method below.

It is assumed that a cell is overlapped at a position (ax, ay) on an act. The picture element cell[0][0] at the most leftward and uppermost point of the cell is overlapped to the picture element act[ax][ay] of the act, and the picture element cell[CELL_WIDTH−1][CELL_HEIGHT−1] at the most rightward and lowermost point of the cell is overlapped to the picture element act[ax+CELL_WIDTH−1][ay+CELL_HEIGHT−1] of the act. In a region (ax≦x≦ax+CELL_WIDTH, ay≦y≦ay+CELL_HEIGHT) of the act in which the cell is overlapped, it is judged whether or not a handwriting is written at a picture element (cell[cx][cy]) with respect to all picture elements (one of these picture elements is expressed with act[ax+cx][ay+cy]) which have densities greater than 0 (that is, the all picture elements have handwriting), the picture element (cell[cx][cy]) corresponding to one of the all picture elements.

When handwriting is written at the picture element cell [cx][cy], the density of the picture element act[ax+cx][ay+cy] is added to the match value. This operation uses the density as a weighting factor for the match value, because the handwriting is more likely to be written at the picture element as the density of the act picture element is higher.

Figure 10:
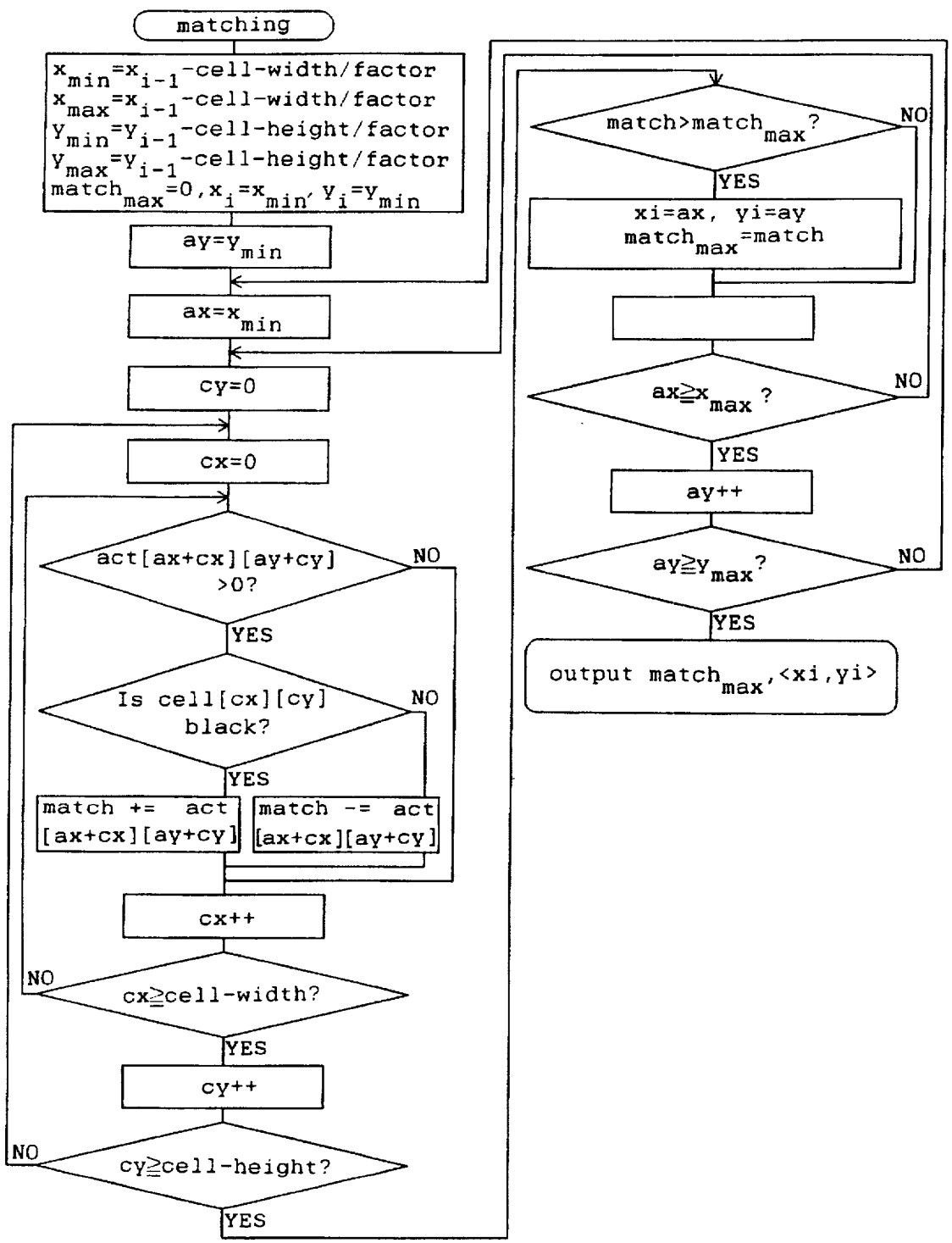
FIG. 10 is a flowchart which explains the matching routine in detail in the flowchart illustrated in FIG. 9.

When the handwriting is not written at the picture element cell[cx][cy], the density of the picture element act[ax+cx][ay+cy] is subtracted from the match value. This operation represents that, at the coordinate at which matching is performed, it is more likely not to be a match when the handwriting is not written at the corresponding picture element in the cell, because the handwriting is more likely to be written at the picture element of the act as the density is higher, which is similar as the case that the handwriting is written at the corresponding picture element. The matching procedure is illustrated in FIG. 10 by a flowchart.

Summarizing the above, the matching algorithm takes a cell to be matched, and overlaps a coordinate in the cell (0, 0 for example) with a coordinate of the act (0, 0 for example). The matching algorithm then checks each coordinate in the cell to see if the picture element at that coordinate has handwriting. If the coordinate has handwriting, then the density of the picture element for the act is added to the match value corresponding to the act coordinate (0, 0). The series of operations is performed for all coordinate in the cell by varying the coordinate of the cell and the coordinate of the act so that the match value corresponding to the act coordinate (0, 0) is obtained.

After the match value corresponding to the act coordinate (0, 0) has been calculated for every coordinate in the matching region, the cell coordinate (0, 0) is then overlapped to a new act coordinate (0, 1 for example) and a new match value corresponding to the act coordinate (0, 1) is calculated. The highest match value for all the coordinates in the matching region determines how the cell image is overlapped on the act image.

Next, a method of overlapping a cell to an act is described.

A method for overlapping a cell to an act at a position (X, Y) is expressed by the following formulae.

```
for(x=0;x<CELL_WIDTH;x++){
    for(y=0;y<CELL_HEIGHT;y++){
        if(cell[x] [y]==BLACK{
            act[X+x] [Y+y]=up(act[X+x] [Y+y];
        }else{
            act[X+x] [Y+y]=down(act[X+x] [Y+y];
        }
    }
}
```

Where, the function up(z) returns a density which is obtained by overlapping a picture element of a black point to a picture element having a density of z (the density value z corresponds to the match value), and the function down(z) returns a density which is obtained by overlapping a picture element of a white point to a picture element having a density of z. In the simplest case, the function up(z) adds a value of 1 to the density value z so as to renew the match value, and the function down(z) subtracts a value of 1 from the density value z so as to renew the match value.

Figure 11:
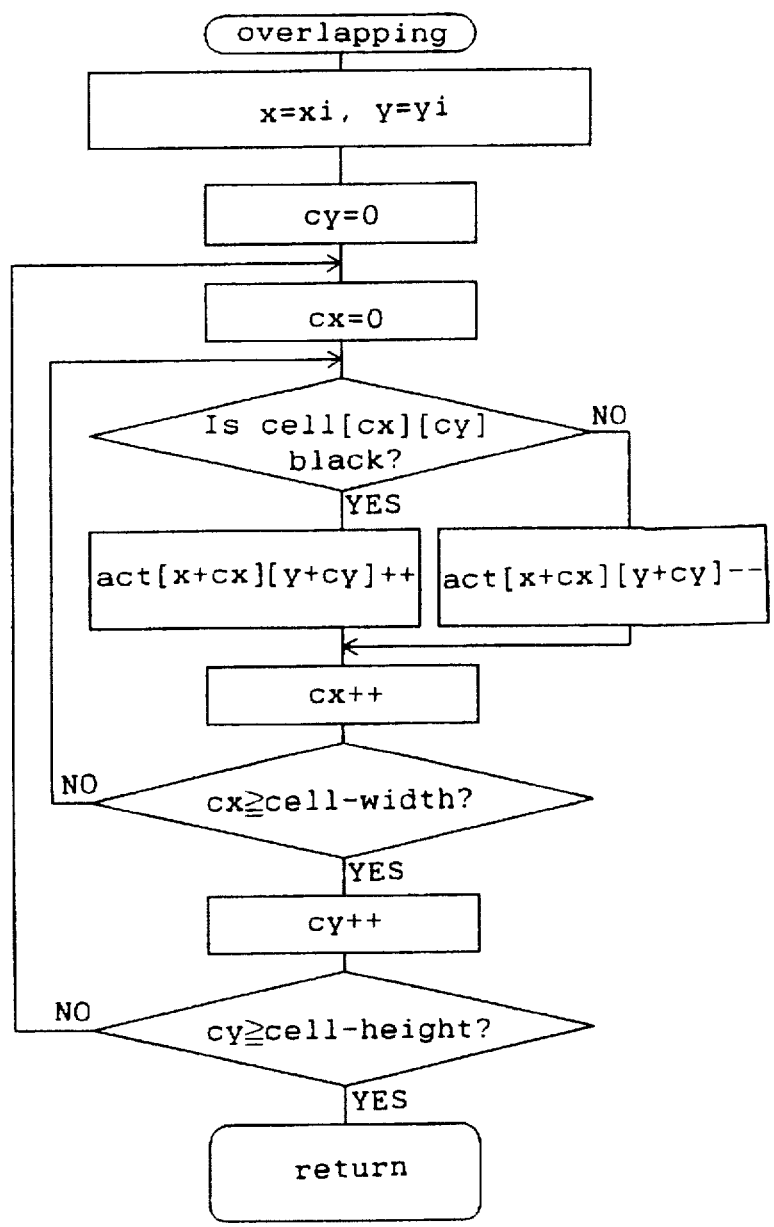
FIG. 11 is a flowchart which explains the overlapping routine in detail in the flowchart illustrated in FIG. 9.

The overlapping procedure is illustrated in FIG. 11 by a flowchart.

In the act constructing method, it is preferable that a written length of a long line or the like is calculated based upon a moving speed of the leading edge of the lead 2 and a continuation time of the stress sensor signal which represents the lead 2 being contacted the paper. The long line is accordingly reproduced as a long line. The moving speed is obtained based upon the handwriting image data. When the stress sensor signal representing the lead 2 being apart from the paper, corresponding small image data are not objected for matching algorithm because taken image is reduced in size to some degree. Instead, a moving direction and a moving distance of the leading edge of the lead 2 from moving away from the paper to contact the paper are calculated based upon a moving direction of handwriting in a small image when the stress sensor signal representing the lead 2 being apart from the paper, a continuation time of the stress sensor signal which represents the lead 2 being apart from the paper, and a moving speed of the leading edge of the lead 2.

Next, a scene constructing method is described.

Figure 13:
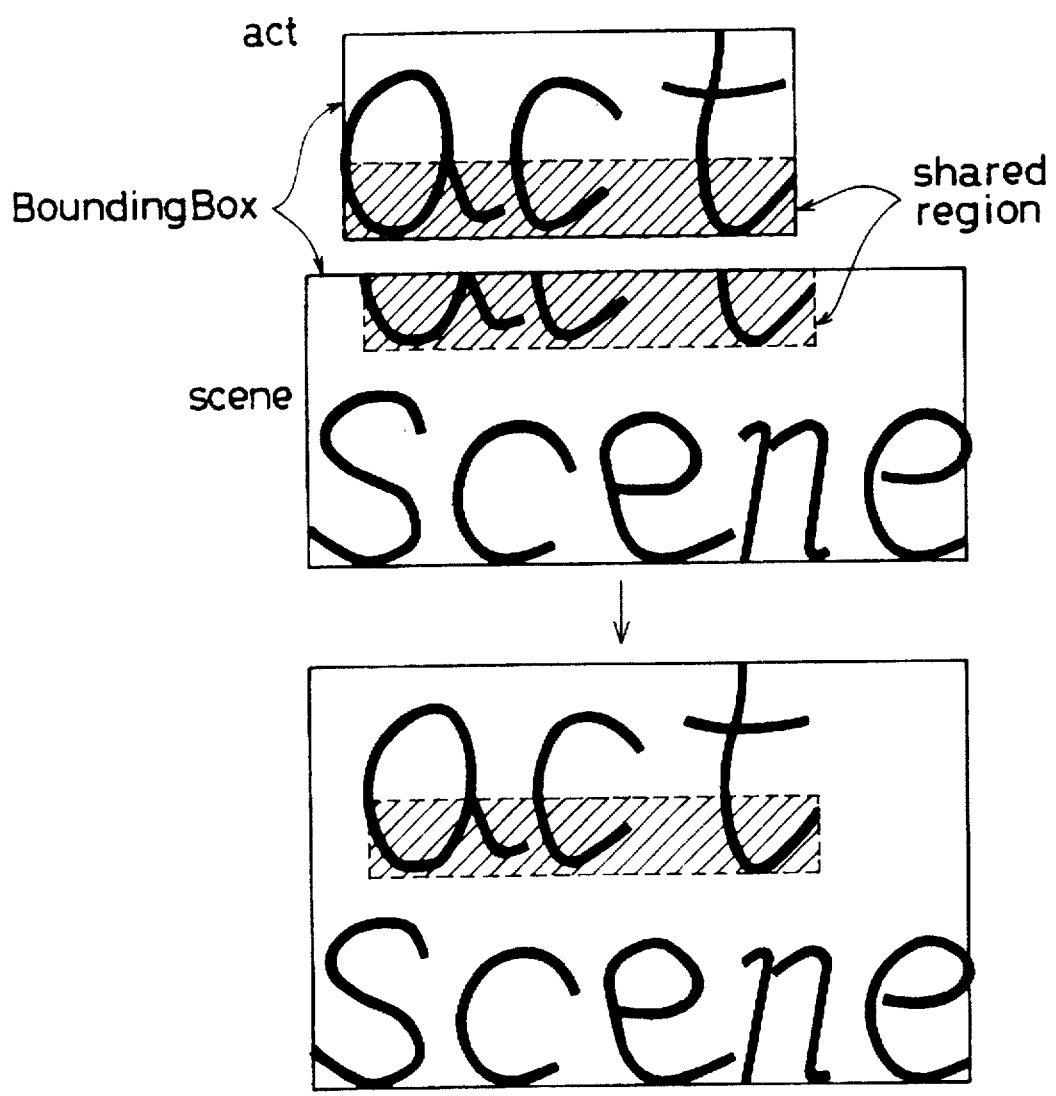
FIG. 13 is a diagram useful in understanding obtaining of a scene from acts.

When an act is constructed from cells, and when a positional relationship between a cell and an act cannot be obtained, subsequent cells are objected to a new act for reproducing handwriting. In this case, a partial handwriting may appear in the new act which partial handwriting also appears in one of prior acts so that a positional relationship between two acts may be obtained. In such a case, a matching operation is performed between a scene which is constituted by one or more prior acts and the new act so that a common handwriting is detected. Then, the new act is overlapped to the scene so as to construct a new scene. A specific example of scene construction is illustrated in FIG. 13. There are two matching regions one of which is a partial region of the act, and the other of which is a partial region of the scene.

For obtaining a positional relationship between an act and a scene, a matching operation is performed which is similar to that of the case for constructing an act from cells. An act includes a handwriting which is actually written within the act and a part of a handwriting which was written within one of prior acts. When a movement vector of the lead 2 is obtained from position data of the lead 2 when the act was reproduced from cells, and an actually written handwriting within the act is removed based upon the movement vectors, a handwriting remains which was previously written. Hereinafter, the handwriting is referred to as the existing handwriting. The existing handwriting should exist in one of previously reproduced scenes. Therefore, the positional relationship of a scene and an act which include the existing handwriting in common is detected, then the act and scene are overlapped to one another.

Figure 14:
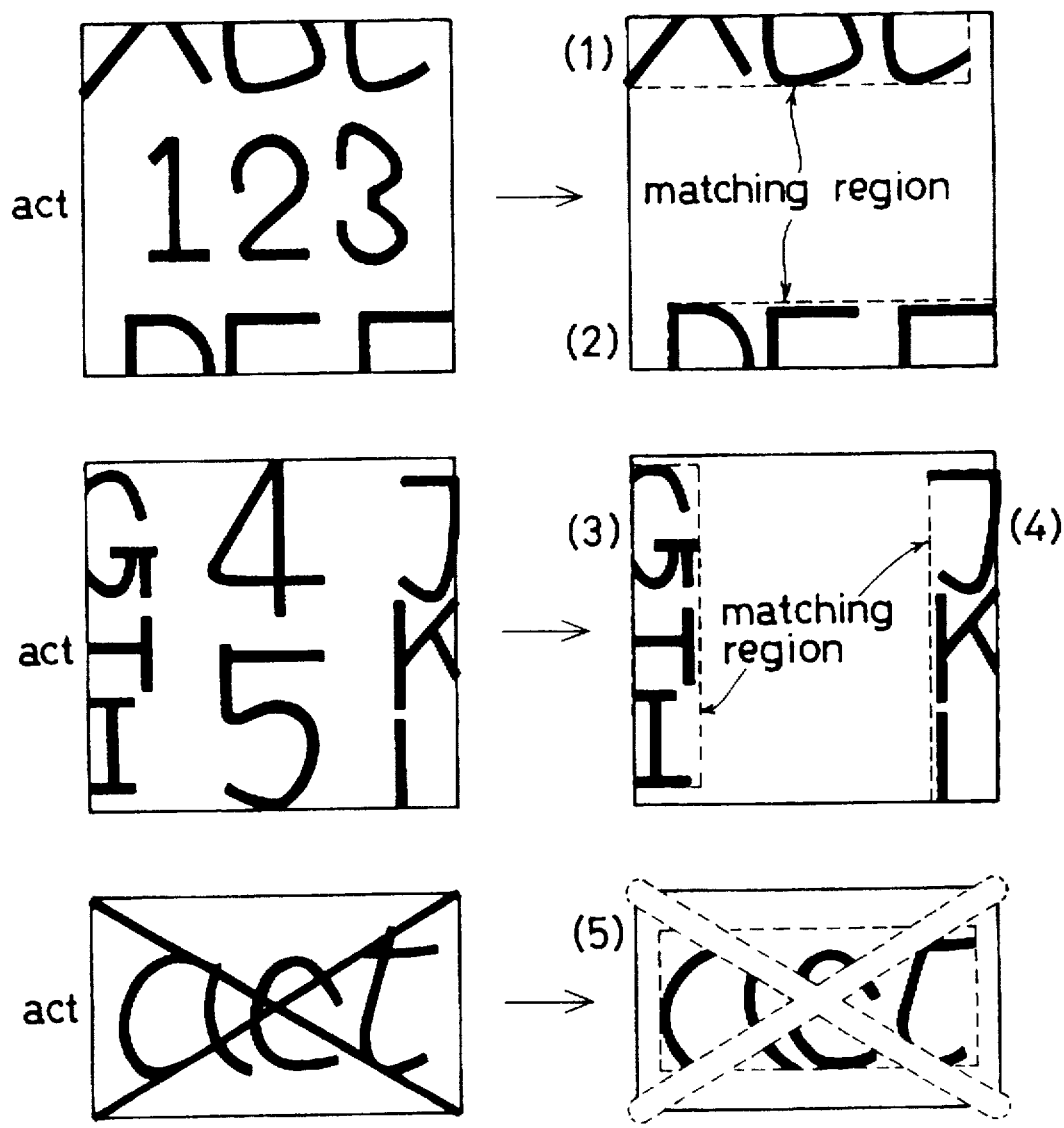
FIG. 14 is a diagram useful in understanding classification of matching regions depending upon an existing region of a written handwriting.

Five species of classification is performed and a matching region is defined based upon the position of the existing handwriting within the act. The classification of matching regions is illustrated in FIG. 14.

(1) When the existing handwriting appears in an upper portion of an act, it is thought that the existing handwriting is a lower portion of a handwriting in a scene previously reproduced. Therefore, the matching regions are taken to be in the upper portion of the act and in the lower portion of the scene, respectively. The height of the matching regions are determined to be the height of the BB of the existing handwriting in the scene. In a similar manner, when the existing handwriting appears in (2) a lower portion, (3) a leftward portion, (4) a rightward portion of an act, the matching regions are taken to be in the lower portion of the act and in the upper portion of the scene, in the leftward portion of the act and in the rightward portion of the scene, in the rightward portion of the act and in the leftward portion of the scene, respectively.

Further, (5) when the existing handwriting has appeared in a central portion of an act, it is thought that the handwriting actually written in the act overwrites on a scene which has been previously written. For example, correcting the written handwriting with "x", "=" and the like represent the case (5). In this case, the existing handwriting may appear in the entire region of the BB of the act and in the entire region of the BB of the scene, because the region of the existing handwriting cannot be limited. Therefore, the matching regions are determined to be the entire region of the BB of the act and the entire region of the BB of the scene.

Matching is performed between an act and a scene following the defined matching regions.

The positional relationship between an act and a scene may not exactly be vertical or horizontal (the act and the scene may be inclined to some degree to one another), the matching region can be extended by half of the height of the BB of the existing handwriting in upward or downward, and can be extended by half of the width of the BB of the existing handwriting in leftward or rightward.

Next, a matching method between an act and a scene is described.

A matching is performed in the matching regions of an act and a scene so that a position is obtained for overlapping the act and the scene with the least amount of contradiction. The position is determined to be a position for giving the maximum value of $match_{sc}$ which is similar to that of constructing an act from cells.

It is assumed that the matching is performed between an act $act_i$ and a scene $scene_j$. The act and the scene are overlapped to one another at every coordinate position within the matching region of the act and the scene, and the matching method is performed similarly to the matching between a cell and an act so that a position (x, y) having the maximum value of $match_{sc}$ is obtained. The first act $act_0$ is put in a proper position in a scene $scene_0$.

When no maximum value of $match_{sc}$ is sufficiently great, the act $act_i$ is not used for constructing the scene $scene_j$. Treatment of the act $act_i$ in this case is thought to be one of two following method.

(1) When the act $act_i$ is an indistinct act (an unclear act), the act $act_i$ is disposed.

(2) When the act $act_i$ and the scene $scene_j$ have no common handwriting, the act $sct_i$ may include a common handwriting which is common to that of a scene prior to the scene $scene_j$. Therefore, the matching of the act $act_i$ is performed with a scene $scene_{j-1}$. When the act $act_i$ matched with the scene $scene_{j-1}$, the act $act_i$ is overlapped to the scene $scene_{j-1}$, otherwise, the act $act_i$ is matched with a $scene_{j-2}$. The act $sct_i$ is sequentially matched with previous scenes until the act $act_i$ is matched with a previous scene. When the act $sct_i$ is matched with no previous scene, the act $act_i$ is considered to be an independent act which has no common handwriting with any one of the previous scenes. A new $scene_{j+1}$ is then provided and the act $act_i$ is overlapped to the $scene_{j+1}$.

All acts are reproduced on scenes by performing the operation described earlier. But, one act may have handwritings common with plural scenes so that a positional relationship between scenes for which a positional relationship should not be obtained, is obtained. In this case, the act and the scenes are overlapped at corresponding positions and are united to a scene having the lowest scene number. Scenes other than the scene having the lowest scene number are set to vacant regions again.

Another scene constructing method is described. This method differs from the above-mentioned scene constructing method in matching region determining procedure. The matching region determining procedure is described.

A newly written handwriting is eliminated so as to remain previously written handwritings in an act, and a BB of the newly written handwriting is determined. The act is divided into 9 regions which are a center region including the newly written handwriting, and an upper region, lower region, center-right region, center-left region, upper-right region, lower-right region, upper-left region, and lower-left region with respect to the center region (refer to FIG. 20). These regions are referred to as "CM", "CT", CB", "RM", "LM", "RT", "RB", "LT", "LB", respectively. A sum of density values of each region is calculated and is compared with a threshold value. When the sum is greater than the threshold value, it is judged that the region includes handwriting. Therefore, regions including previously written handwriting is detected, and relative positions of the previously written handwritings with respect to the newly written handwriting is detected. Then matching regions of an act and a scene are determined based upon the relative position that is the regions each of which includes a previously written handwriting.

Figure 20:
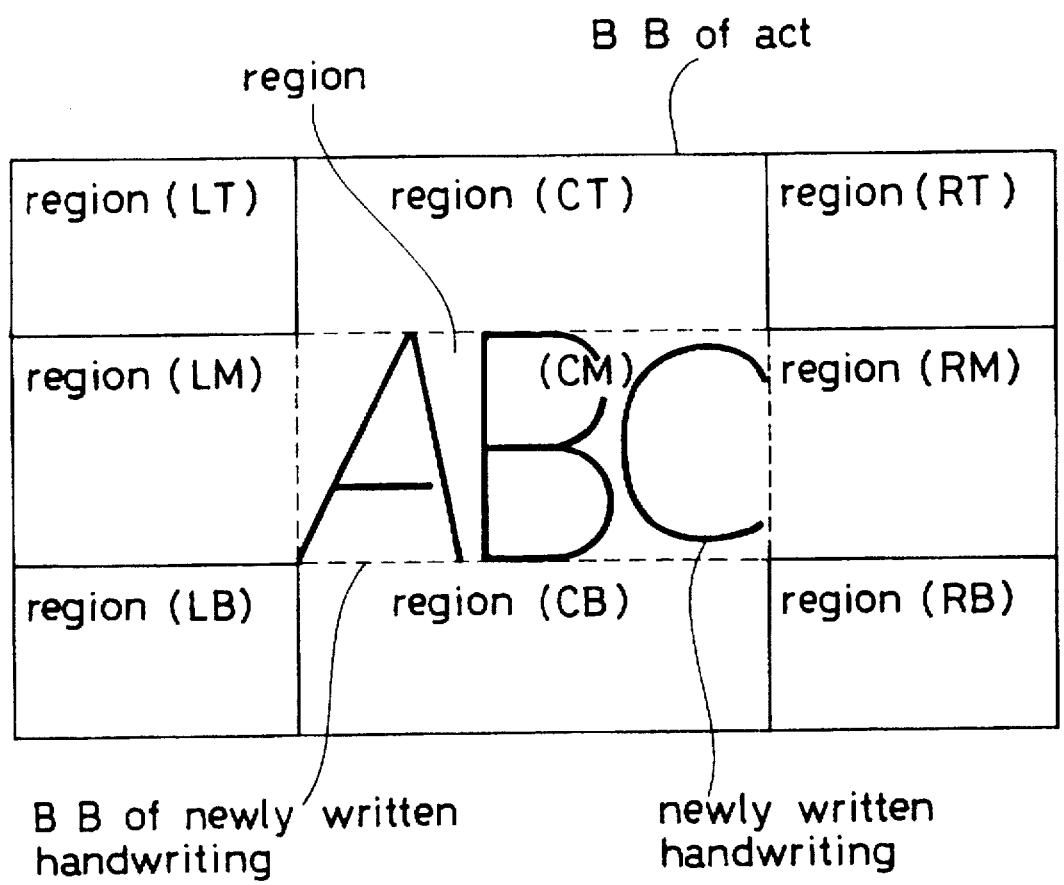
FIG. 20 is a diagram useful in understanding determining of matching regions of an act.
Figure 21:
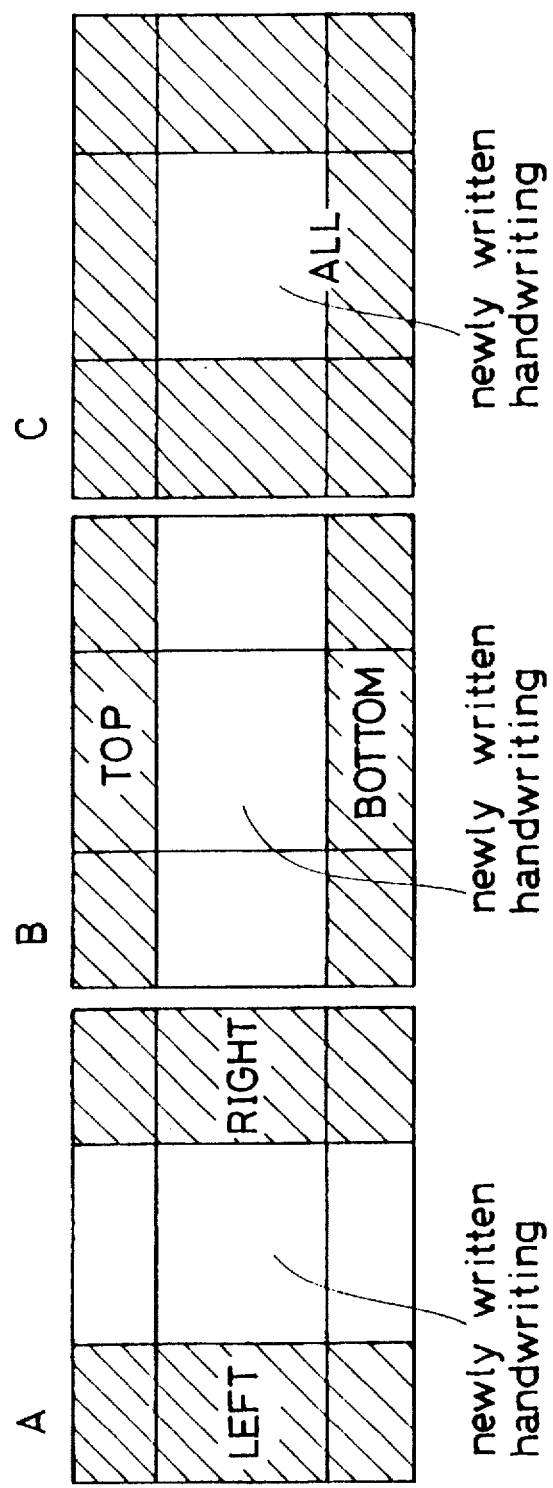
FIG. 21A is a diagram useful in understanding determining of more simple matching regions of an act.
FIG. 21B is a diagram useful in understanding determining of more simple matching regions of an act.
FIG. 21C is a diagram useful in understanding determining of a more simple matching region of an act.

It is preferable that the regions illustrated in FIG. 20 are simplified into a top region, bottom region, right region, left region and all region as are illustrated in FIGS. 21(A), 21(B), and 21(C). It is also preferable that these regions are represented with binary codes of "0x00001,""0x00010", "0x01000", "0x00100", "0x10000" respectively. These binary codes are logically added when one of the regions of "RT", "RB", "LT", "LB" is designated or when plural regions are designated. When the previously written handwriting exists in the region "CM", that is in the region which includes the newly written handwriting, the matching region is the all region and is represented with a binary code of "0x10000". Therefore, various combinations of matching regions are given in correspondence to the binary code when the binary code is supplied to a pattern matching function as an argument.

Matching regions in a scene are determined in directions each of which is reverse to a direction of a matching region in an act.

Figure 22:
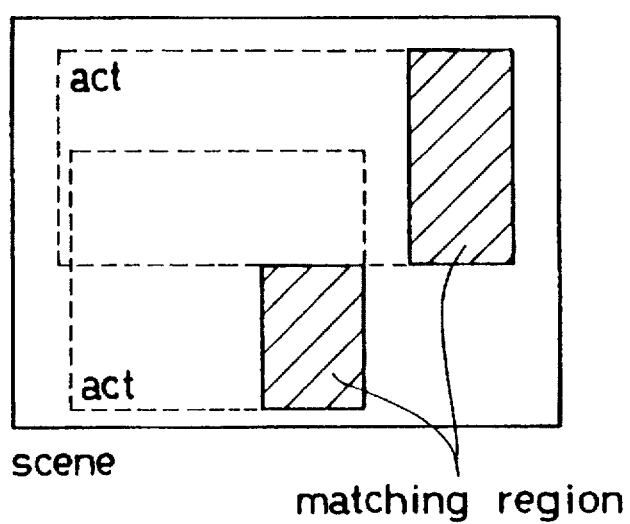
FIG. 22 is a diagram illustrating specific matching regions of a scene.

But, a scene is varied its outer shape following overlapping of acts. Therefore, a right position for overlapping an act may not be determined when matching regions are determined to be similar to matching regions of an act (a rectangle at an upper, lower, left-ward or right-ward position within a BB). For example, when a matching region of an act is the left region, a matching region of a scene is a right-edge region of the scene. The matching region of the scene is not a BB at the right edge of the scene but an entirety or a part of a BB at the right edge of each act $act_{sc}$ which constitutes the scene. More particularly, a matching region of a scene is a part of an edge region of an act $act_{sc}$ which part does not overlap to other act $act_{sc}$. FIG. 22 is a specific example illustrating matching regions of a scene. In FIG. 22, there are two matching regions.

It is preferable that a matching region of a scene is determined by the following operations. (1) a region having a constant width or constant height at an edge portion of each $act_{sc}$ act which constitutes the scene is determined to be a proposed matching region (hereinafter, a proposed matching region is referred to as an edge-box). (2) When edge-boxes are overlapped to one another, and when these edge-boxes have x-coordinate values which are near to one another and have widthes which are similar to one another, or when these edge-boxes have y-coordinate values which are near to one another and have heights which are similar to one another, these edge-boxes are united to one edge-box which has edge points at the most upper-left point and the most lower-right point among edge points of these edge-boxes. (3) When the most of the edge-box overlaps to other acts excepting edge-boxes thereof, the edge-box is determined not to be a matching region. (4) Remaining all edge-boxes are determined to be matching regions of the scene.

Figure 23:
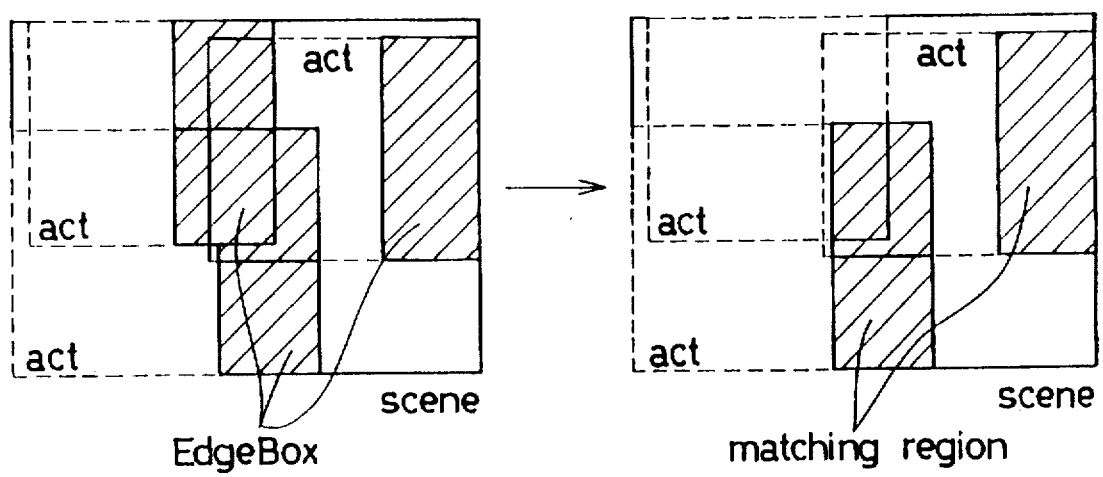
FIG. 23 is a diagram useful in understanding determining of more simple matching regions of a scene.
Figure 24:
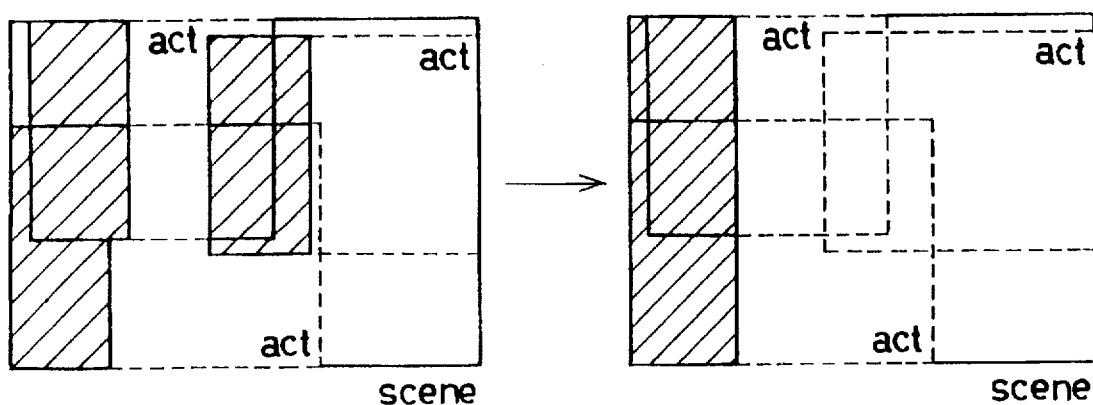
FIG. 24 is a diagram useful in understanding determining of a more simple matching region of a scene.

Specific examples are illustrated in FIGS. 23 and 24.

When a scene has plural matching regions, pattern matching between an act and a scene is carried out in every matching region.

When a matching region exists in plural scenes depending upon a previously written handwriting, scene numbers and coordinate values within each scene are memorized corresponding to each matching region in which a handwriting of an act and a handwriting of a scene match to one another, therefore linkage between an act and scenes is performed. When two or more scenes correspond to each matching region of an act, two or more scenes can be united to one scene, because one act matches to two or more scenes.

A page is constituted by a series of scenes which represent a collection of writing operations. Positional relationship between pages is not clear because acts which are related based upon their positional relationships are united as a scene. Therefore, a punctuation indicating a page is obtained by detecting a punctuation which is given by one of the following method.

Figure 8:
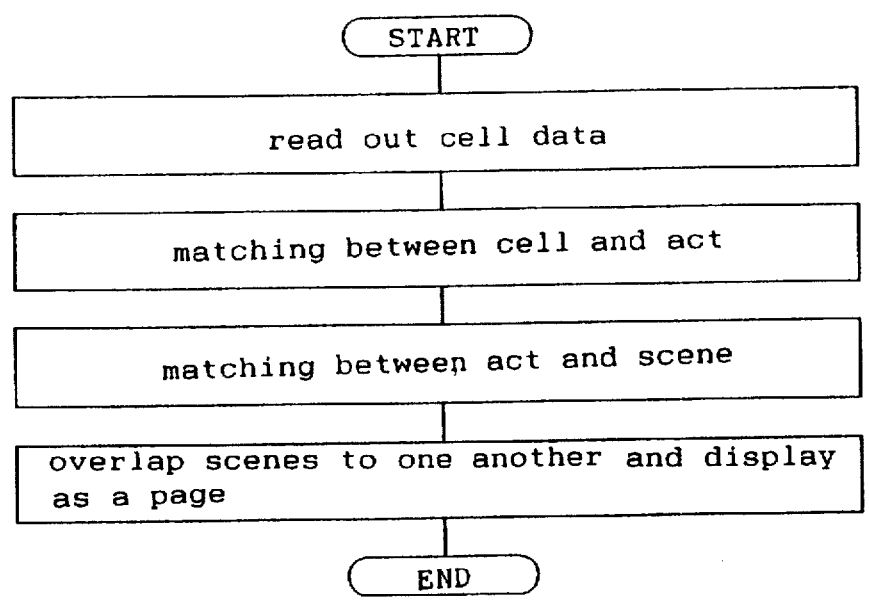
FIG. 8 is a flowchart explaining a schematic operation in its entirety of the handwriting storing and reproducing apparatus.

(1) A user distinctly gives the punctuation by activation of a mechanism which is provided as a hardware to the writing device for storing handwriting or by a gesture with the writing device, or (2) a user gives the punctuation by turning off the power source after a series of writing operations using the writing device. The handwriting reproducing procedure in its entirety above-mentioned is schematically illustrated in FIG. 8.

When a page is constructed by two or more scenes, each scene has no handwritings common with other scenes. But, a positional relationship between two scenes can be detected by the following operation.

It is assumed that handwriting in a scene 2 is written just after a scene 1 as is illustrated in FIG. 16. A time period between the end of the handwriting in the scene 1 and the beginning of the handwriting in the scene 2 can be detected based upon a continuation time of the stress sensor signal which represents the lead 2 being apart from the paper. A moving speed and a moving direction of the leading edge of the lead 2 can be detected based upon the last several cells of the scene 1. FIG. 17 illustrates the last three cells of the scene 1. In FIG. 17, the leftmost cell is the third last cell, the center cell is the second last cell, and the rightmost cell is the last cell. Also, the second last cell illustrates handwriting corresponding to the third last cell with a dashed line, the last cell illustrates handwritings corresponding to the third last cell and the second last cell with dashed lines. Further, a moving direction of the last picture element of the handwriting is illustrated with arrows in the last cell and the second last cell. A direction opposite to the arrows is the moving direction. Also, a moving speed can be calculated based upon the length of the arrow because cells are taken at a predetermined sampling interval. That is, a reversed arrow represents a spacially moving vector. A moving distance between the end of the handwriting in the scene 1 and the beginning of the handwriting in the scene 2 is calculated based upon the time period and the moving speed. Therefore, the positional relationship between the scene 1 and the scene 2 is determined based upon the moving direction and the moving distance.

When the leading edge of the lead 2 moves away from the paper and then contact the paper, the leading edge generally moves by almost constant speed and in almost constant direction. Therefore, the positional relationship between two scenes is properly obtained.

It is preferable that spacially moving vectors are regulated to unit vectors which have a unit length, and each scene is disposed with respect to other scene in a direction of the unit vector and at a position apart by a constant distance.

It is also preferable that a relative position between gravities of two scenes is determined based upon a spacially moving vector, and two scenes are disposed by arranging both gravities. More particularly, when the spacially moving vector is near an x-axis (x-component is greater than y-component), both gravities are arranged to have the same y-coordinate values, otherwise, both gravities are arranged to have the same y-coordinate values. In this case, handwritings each constituting a scene are arranged horizontally or vertically.

In the above-mentioned embodiment, it is assumed that a density of a picture element is determined to be binary, but the density can be expanded to be a multiple gradation. In this case, following points should be considered.

(1) A method is varied which judges whether or not a handwriting is written in an act act[ax+cx][ay+cy] and in corresponding cell cell[cx][cy] when a value of a matching is obtained. It is judged whether or not a picture element has a density value which is greater than a predetermined density value to determine whether or not the handwriting is written in the act act[cx][cy].

(2) Definitions of the function up and the function down are varied so as to take a density value of each picture element which should be overlapped to another picture element. For example, it is discussed above that the function up adds the density value of the picture element which should be overlapped, and the function down subtracts the density value of the picture element which should be overlapped.

When images of cells, acts and the like are expanded to color images, the density value of the picture element is obtained by some operation from the density values of each of RGB components. In general, when density values of R (red), G (green) and B (blue) are determined to be r, g, b, respectively, the density value is given by a linearly coupled value $f = a_1 r + a_2 g + a_3 b$.

When the parameters $a_1$, $a_2$ and $a_3$ are adjusted, ruled lines and the like can be separated from the handwriting. The ruled lines and the like are illustrated on a paper from the beginning.

The handwriting storing and reproducing apparatus above-mentioned performs storing of a handwriting with the writing device for storing handwriting, and performs reproducing of the handwriting with the computer 10 which is provided separatedly with the writing device for storing handwriting. It is possible that a writing device for storing handwriting includes the handwriting reproducing software therein, and the writing device reproduces handwriting on a display device which is provided to the handwriting device. It is also possible that only the display device is provided separatedly from the writing device.

Further, in the embodiment above-mentioned, the writing device having the arrangement illustrated in FIG. 2 is employed. But, the writing device is not limited to this arrangement. It is sufficient that the writing device has a function which detects handwriting optically and a function which stores the detected handwriting.

Figure 15:
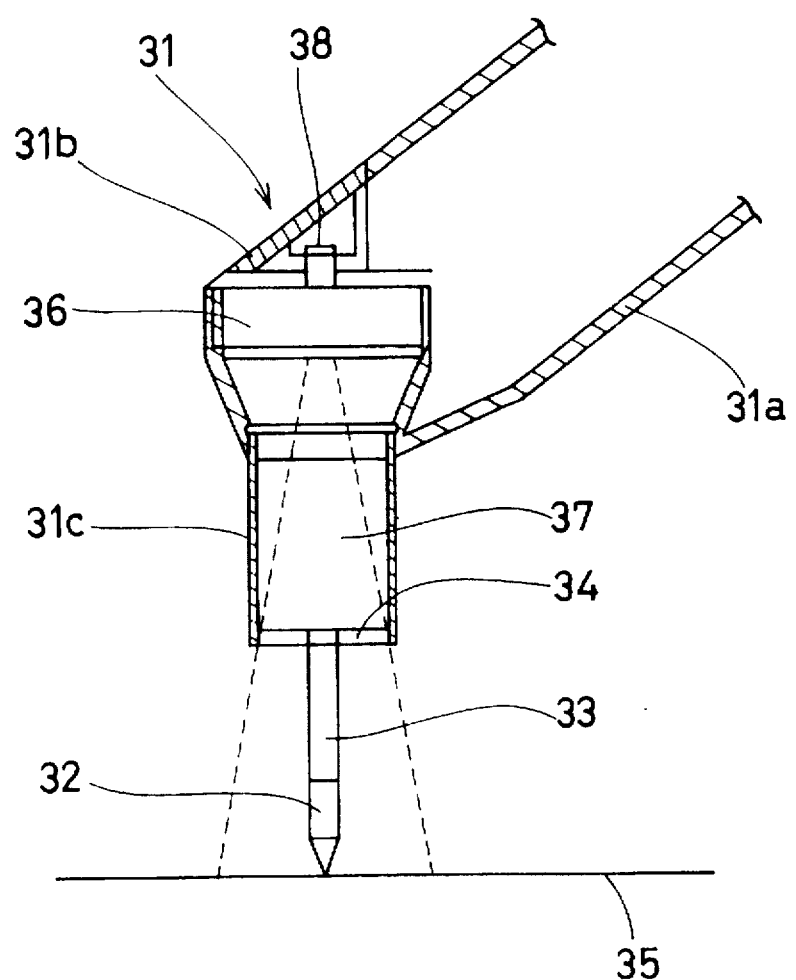
FIG. 15 is a cross sectional view of a writing device for storing handwriting according to another embodiment of the present invention.

FIG. 15 illustrates an arrangement of another writing device for storing handwriting. In the writing device illustrated in FIG. 15, a case body 31 includes a grasping section 31a, an openable door section 31b and a leading edge section 31c, and the grasping section 31a and the leading edge section 31c are bent relative to one another. The leading edge section 31c provides a lead holder 33 for holding a lead 32, and the lead holder 33 is held by a lead holding plate 34. Further, a CCD area sensor 36 is provided in a leading edge section of the grasping section 31a, and a lens system 37 is provided between the CCD area sensor 36 and the lead holding plate 34 in the leading edge section 31c. Furthermore, a microcomputer for performing controlling for detecting a handwriting, a storing device for storing a detected handwriting as electrical information, and a battery, which are not illustrated, are provided within the grasping section 31a. Also, a stress sensor 38 is provided within the leading edge section 31a of the grasping section 31a so as to detect a condition of the lead 32 to determine whether or not actual writing is being carried out.

The writing device makes the face of the CCD area sensor 36 and the face of the lens system 37 parallel to the face 35 for recordation, even when a writer grasps the writing device for storing handwriting as similar as of grasping of an ordinary writing device. Therefore, a handwriting can be detected with little deformation and with relative accuracy.

The handwriting reproducing method can easily be expanded to an image reproducing method which reproduces a larger image from plural small images. In this case, the small images are previously obtained by a camera, an optical temperature detector employing a CCD area sensor, or the like. Each of the small images is overlapped in the similar way as of the embodiment so that a larger image is finally obtained. Also, the construction of a "cell", "act", "scene", and "page"0 are applicable to the image reproducing method.

Figure 18:
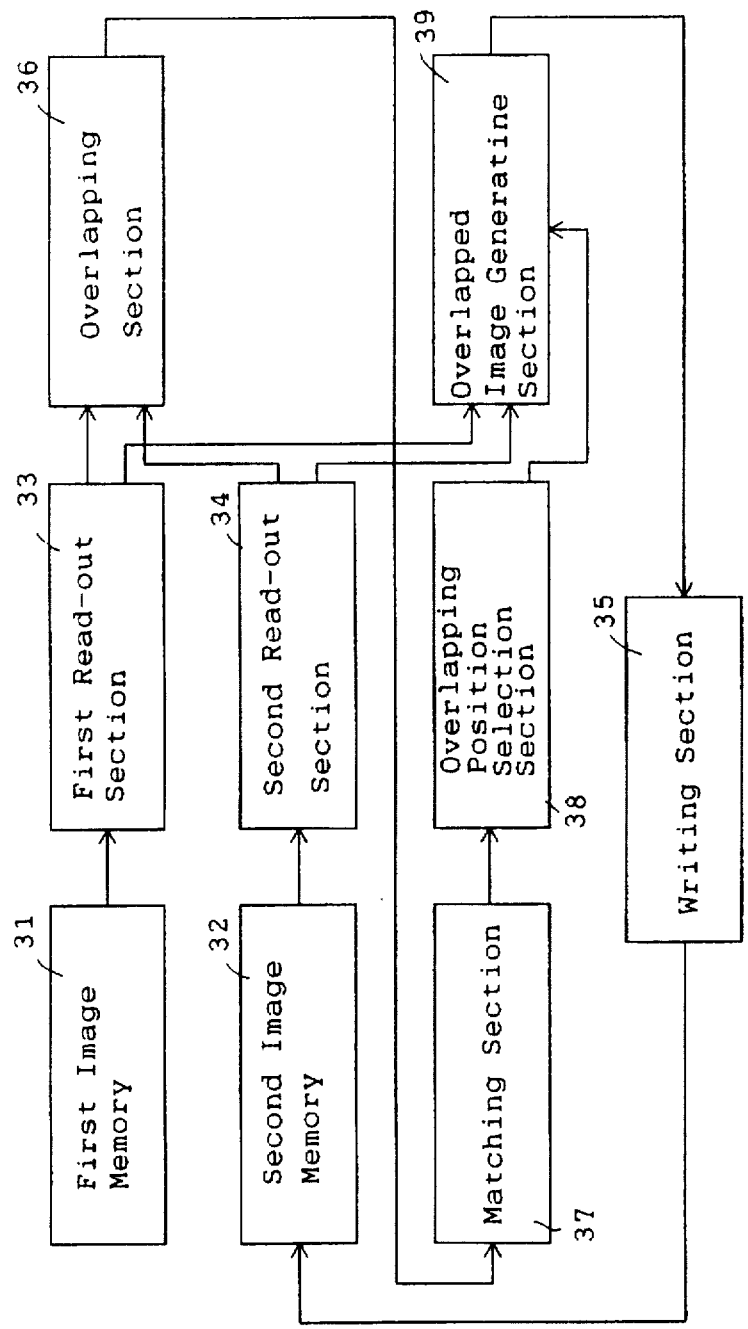
FIG. 18 is a block diagram illustrating an arrangement of an image reproducing apparatus according to a further embodiment of the present invention.

FIG. 18 is a block diagram illustrating an arrangement of an image reproducing apparatus according to a further embodiment of the present invention.

The apparatus includes a first image memory 31, a second image memory 32, a first reading-out section 33, a second reading-out section 34, a writing section 35, an overlapping section 36, a matching section 37, an overlapping position selection section 38, and an overlapped image generating section 39.

The first image memory 31 stores small image data sequentially which are taken by a camera or the like (not illustrated in FIG. 18) and are transformed into the image data by an electrical circuitry (not illustrated in FIG. 18).

The second image memory 32 stores an overlapped image data which is obtained by overlapping two or more small image data.

The first reading-out section 33 reads out the small image data sequentially from the first image memory 31 and supplies the read out small image data to the overlapping section 36.

The second reading-out section 34 reads out the overlapped image data from the second image memory 32 and supplies the read out overlapped image data to the overlapping section 36.

The overlapping section 36 overlaps the supplied small image data to the supplied overlapped image data. The overlapping section 36 repetitively overlaps the small image data to the overlapped image data, and an overlapping position is shifted at every overlapping.

The matching section 37 performs a matching operation based upon every overlapped image data obtained by the overlapping section 36 so as to calculate a match value. The matching operation is similar to the matching algorithm.

The overlapping position selection section 38 selects a position in the read out overlapped image at which position the maximum match value is obtained.

The overlapped image generating section 39 overlaps the read out small image data to the read out overlapped image data at the selected position so as to generate a new overlapped image data.

The writing section 35 writes the new overlapped image data into the second memory 32.

When the apparatus is employed, the first read-out section 33 reads out a small image data from the first image memory 31 and the second read-out section 34 reads out an overlapped image from the second image memory 32. Then the overlapping section 36 overlaps the small image data to the overlapped image data. The matching section 37 calculates a matching value for every overlapped image data. The overlapping position selection section 38 selects a position at which the maximum match value is obtained. The overlapped image generating section 39 overlaps the small image data to the overlapped image data at the selected position so as to generate a new overlapped image data. The writing section 35 writes the new overlapped image data into the second image memory 34. Thereafter, the series of operations is repeated.

When a more large image should be reproduced, an arrangement similar to this embodiment should be added.

Figure 19:
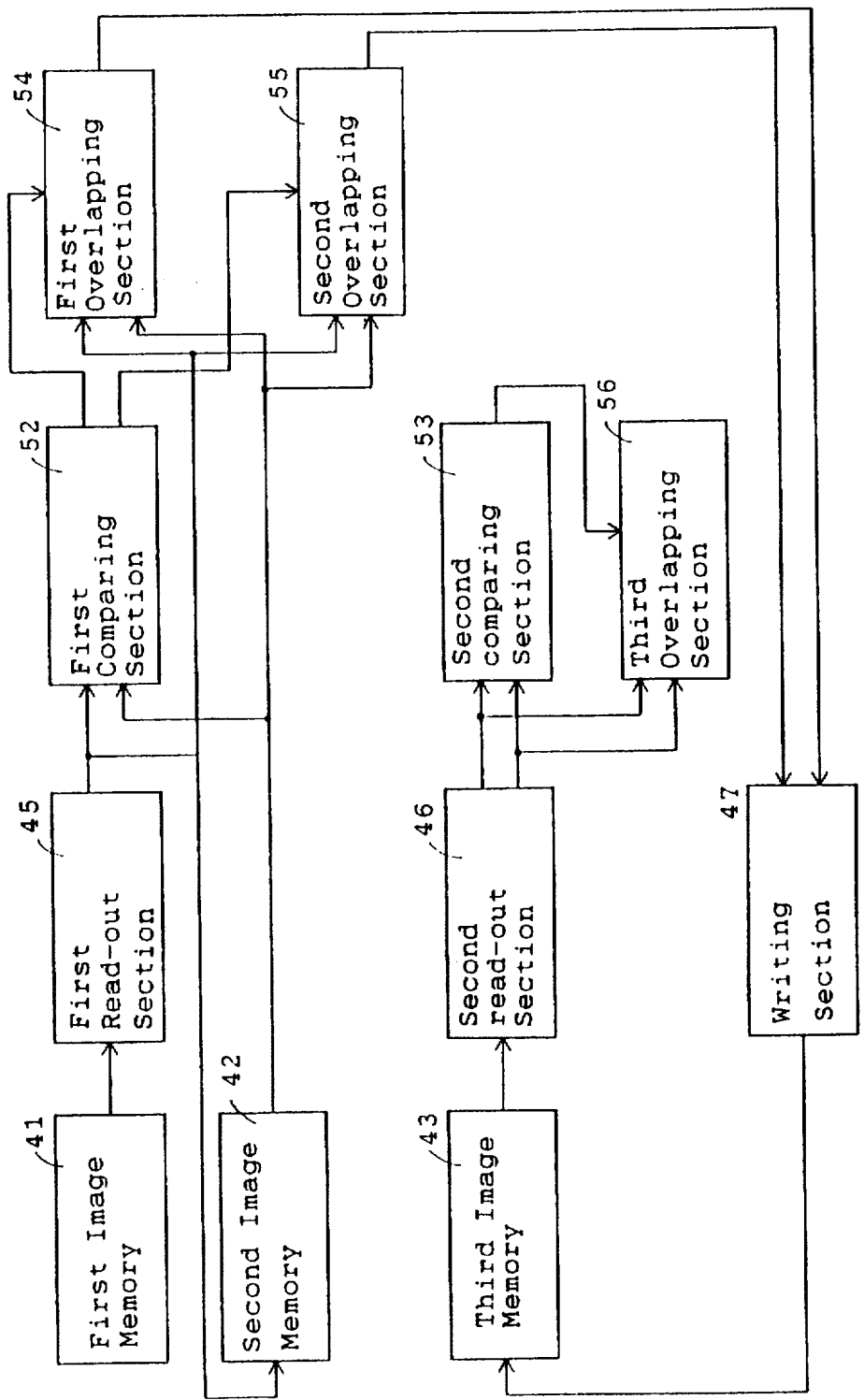
FIG. 19 is a block diagram illustrating an arrangement of a handwriting reproducing apparatus according to a yet another embodiment of the present invention.

FIG. 19 is a block diagram illustrating an arrangement of a handwriting reproducing apparatus according to a yet another embodiment of the present invention.

The apparatus includes a first image memory 41, a second image memory 42, a third image memory 43, a first reading-out section 45, a second reading-out section 46, a writing section 47, a first comparing section 52, a second comparing section 53, a first overlapping section 54, a second overlapping section 55, and a third overlapping section 56.

The first image memory 41 stores small image data sequentially which are taken by a CCD area sensor 4 and are transformed into the image data by an electrical circuitry (not illustrated in FIG. 19).

The second image memory 42 stores a previously read out small image from the first image memory 41.

The third image memory 43 stores a partial image data which is obtained by overlapping two or more small image data.

The first reading-out section 45 reads out the small image data sequentially from the first image memory 41 and supplies the read out small image data to the first overlapping section 54 and the second image memory 42.

The second reading-out section 46 reads out the overlapped image data from the third image memory 43 and supplies the read out overlapped image data to the second overlapping section 55.

The first comparing section 52 compares a just read out small image data with a previously read out small image data and judges whether or not both small image data include partial handwriting data which are coincident to one another.

The second comparing section 53 compares one of partial image data with another partial image data and judges whether or not both partial image data include partial handwriting data which are coincident to one another.

The first overlapping section 54 overlaps the just read out small image data to the previously read out small image data so as to obtain a new image data and to determine the new image data as the previously read out small image data.

The second overlapping section 55 overlaps the just read out small image data to the previously read out small image data so as to obtain a new image data and to determine the new image data as the previously read out small image data.

The first overlapping section 54 operates when the first comparing section 52 judges that both small image data include partial handwriting data which are coincident to one another. The second overlapping section 55 operates after the first comparing section 52 judges that both small image data do not include partial handwriting data which are coincident to one another.

The third overlapping section 56 overlaps one of the partial image data to another partial image data so as to obtain a larger image data and to determine the larger image data as the another partial image data.

The writing section 47 writes the finally obtained new image data by the first overlapping section 54 or the second overlapping section 55 into the third image memory 43 as a partial image data.

When this apparatus is employed, sequentially read out small image data are sequentially overlapped to a previously read out small image data so as to obtain a partial image data. When two or more partial image data are obtained, one of the partial image data is overlapped to another partial image data so as to obtain a larger image data. The larger image data includes reproduced handwriting.

What is claimed is:

1. A handwriting storing and reproducing apparatus comprising;

writing device means for storing handwriting, including a writing section for writing handwriting on a medium for recording, an optical handwriting detection means for taking an image at a predetermined interval in a vicinity of said writing section on the medium and for sequentially detecting small images within a predetermined region which includes said writing section, and a storing means for sequentially storing the detected small images, reading out means for sequentially reading out the small images from said storing means, comparing means for comparing a just read out small image with a previously read out small image, and for judging whether or not both small image include partial handwritings which are coincident to one another, and image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and for repeating the overlapping at every reading out of a small image.

2. A handwriting storing and reproducing apparatus comprising;

writing device means for storing handwriting, including a writing section for writing handwriting on a medium for recording, an optical handwriting detection means for taking an image at a predetermined interval in a vicinity of said writing section on the medium and for sequentially detecting small images within a predetermined region which includes said writing section, and a storing means for sequentially storing the detected small images, reading out means for sequentially reading out the small images from said storing means, comparing means for comparing a just read out small image with a previously read out small image, and for judging whether or not both small images include partial handwritings which are coincident to one another, first image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and for repeating the overlapping at every reading out of a small image so as to reproduce a partial image which is larger than the small image, when said comparing means judges that both small images include partial handwritings which are coincident to one another, and second image processing means for overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, and for repeating the overlapping at every reading out of a small image so as to reproduce another partial image which is larger than the small image.

3. A handwriting storing and reproducing apparatus comprising;

writing device means for storing handwriting, including a writing section for writing the handwriting on a medium for recording, an optical handwriting detection means for taking an image at a predetermined interval in a vicinity of said writing section on the medium and for sequentially detecting small images within a predetermined region which includes said writing section, and a storing means for sequentially storing the detected small images, reading out means for sequentially reading out the small images from said storing means, first comparing means for comparing a just read out small image with a previously read out small image, and for judging whether or not both small images include partial handwritings which are coincident to one another, first image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and for repeating the overlapping at every reading out of a small image so as to reproduce a partial image which is larger than the small image, when said first comparing means judges that both small images include partial handwritings which are coincident to one another, second image processing means for overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, and for repeating the overlapping at every reading out of a small image so as to reproduce another partial image which is larger than the small image, after said first comparing means has judged that both small images do not include partial handwritings which are coincident to one another, second comparing means for comparing one of the partial images with another partial image, and for judging whether or not both partial images include partial handwritings which are coincident to one another, and third image processing means for overlapping the one of the partial images to the another partial image in a condition that a partial handwriting in the one of the partial images is exactly overlapped to a partial handwriting in the another partial image, so as to obtain a larger image and to determine the larger image as the another partial image, when both partial images include the partial handwritings which are coincident to one another.

4. A handwriting storing and reproducing apparatus as set forth in claim 3, further comprising:

moving vector obtaining means for obtaining a moving vector based upon plural sequential small images, and fourth image processing means for determining a relative position between the one of the partial images to the another partial image based upon the moving vector and for disposing both partial images based upon the relative position, so as to obtain a larger image, when both partial images include no partial handwriting which are coincident to one another.

5. A handwriting storing and reproducing apparatus comprising:

a writing section for writing the handwriting on a medium for recording, optical handwriting detection means for taking images at a predetermined interval in a vicinity of said writing section on the medium and for sequentially detecting small images within a predetermined region which includes said writing section, storing means for sequentially storing the detected small images, reading out means for sequentially reading out the small images from said storing means, first comparing means for comparing a just read out small image with a previously read out small image, and for judging whether or not both small images include partial handwritings which are coincident to one another, first image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and for repeating the overlapping at every reading out of a small image so as to reproduce a partial image which is larger than the small image, when said first comparing means judges that both small images include partial handwritings which are coincident to one another, second image processing means for overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, and for repeating the overlapping at every reading out of a small image so as to reproduce another partial image which is larger than the small image, after said first comparing means has judged that both small images do not include partial handwritings which are coincident to one another, second comparing means for comparing one of the partial images with another partial image, and for judging whether or not both partial images include partial handwritings which are coincident to one another, and third image processing means for overlapping the one of the partial images to the another partial image in a condition that a partial handwriting in the one of the partial images is exactly overlapped to a partial handwriting in the another partial image, so as to obtain a larger image and to determine the larger image as the another partial image, when both partial images include the partial handwritings which are coincident to one another.

6. A handwriting storing and reproducing apparatus as set forth in claim 5, further comprising:

moving vector obtaining means for obtaining a moving vector based upon plural sequential small images, and fourth image processing means for determining a relative position between the one of the partial images to the another partial image based upon the moving vector and for disposing both partial images based upon the relative position, so as to obtain a larger image, when both partial images include no partial handwriting which are coincident to one another.

7. A handwriting storing and reproducing apparatus comprising:

a writing section for writing the handwriting on a medium for recording, handwriting storing means for storing handwriting, which includes an optical handwriting detection means for optically detecting small images within a predetermined region in a time sequential manner, and a storing means for sequentially storing the detected small images, reading out means for sequentially reading out the small images from said storing means, first comparing means for comparing a just read out small image with a previously read out small image, and for judging whether or not both small images include partial handwritings which are coincident to one another, first image processing means for overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and for repeating the overlapping at every reading out of a small image so as to reproduce a partial image which is larger than the small image, when said first comparing means judges that both small images include partial handwritings which are coincident to one another, second image processing means for overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include the partial handwritings which are coincident to one another, and for repeating the overlapping at every reading out of a small image so as to reproduce another partial image which is larger than the small image, after said first comparing means has judged that both small images do not include partial handwritings which are coincident to one another, second comparing means for comparing one of the partial images with another partial image, and for judging whether or not both partial images include partial handwritings which are coincident to one another, and third image processing means for overlapping the one of the partial images to the another partial image in a condition that a partial handwriting in the one of the partial images is exactly overlapped to a partial handwriting in the another partial image, so as to obtain a larger image and to determine the larger image as the another partial image, when both partial images include the partial handwritings which are coincident to one another.

8. A handwriting storing and reproducing apparatus as set forth in claim 7, further comprising;

moving vector obtaining means for obtaining a moving vector based upon plural sequential small images, and fourth image processing means for determining a relative position between the one of the partial images to the another partial image based upon the moving vector and for disposing both partial images based upon the relative position, so as to obtain a larger image, when both partial images include no partial handwriting which are coincident to one another.

9. A handwriting reproducing method which reproduces the handwriting of a writing device means which records handwriting on a surface of a medium with a writing section, takes small images of a vicinal region with respect to said writing section with an image-pickup means thereof in a time sequential manner following a movement of said writing section which image-pickup means is housed within a main body of said writing device means, and stores the small images sequentially, said method comprising the steps of;

reading out the small images sequentially, comparing a just read out small image with a previously read out small image, judging whether or not both small image include partial handwritings which are coincident to one another, overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, and repeating the overlapping at every reading out of a small image.

10. A handwriting reproducing method which reproduces the handwriting of a writing device means which records handwriting on a surface of a medium with a writing section, takes small images of a vicinal region of the writing section with an image-pickup means thereof in a time sequential manner following a movement of the writing section which image-pickup means is housed within a main body of said writing device means, and stores the small images sequentially, said method comprising the steps of;

reading out the small images sequentially, comparing a just read out small image with a previously read out small image, judging whether or not both small image include partial handwritings which are coincident to one another, overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, repeating the overlapping when it is judged that both small images include partial handwritings which are coincident to one another, overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include no partial handwritings which are coincident to one another, and repeating the second overlapping at every reading out of a small image so as to reproduce another partial image which is larger than the small image, after it has judged that both small images do not include partial handwritings which are coincident to one another.

11. A handwriting reproducing method which reproduces the handwriting of a writing device means which records the handwriting with a writing section thereof on a surface of a medium, takes small images of a vicinal region of said writing section with an image-pickup means thereof in a time sequential manner following a movement of said writing section which image-pickup means is housed within a main body of said writing device means, and stores the small images sequentially, said method comprising the steps of;

reading out the small images sequentially, comparing a just read out small image with a previously read out small image, judging whether or not both small images include partial handwritings which are coincident to one another, overlapping the just read out small image to the previously read out small image in a condition that a partial handwriting in the just read out small image is exactly overlapped to a partial handwriting in the previously read out small image, so as to obtain a new image and to determine the new image as the previously read out small image, when both small images include the partial handwritings which are coincident to one another, repeating the overlapping at every reading out of a small image so as to reproduce a partial image which is larger than the small image, when it is judged that both small images include portions of handwriting which are coincident to one another, overlapping the just read out small image to another previously read out small image in a condition that a partial handwriting in the just read out small image is exactly overlapped to a partial handwriting in the previously read out small image, so as to obtain another new image and to determine the another new image as the another previously read out small image, when both small images include partial handwritings which are coincident to one another, repeating the second overlapping at every reading out of a small image so as to reproduce another partial image which is larger than the small image, after it has judged that both small images do not include partial handwritings which are coincident to one another, comparing one of the partial images with another partial image, judging whether or not both partial images include partial handwritings which are coincident to one another, and overlapping the one of the partial images to the another partial image in a condition that a partial handwriting in the one of the partial images is exactly overlapped to a partial handwriting in the another partial image, so as to obtain a larger image and to determine the larger image as the another partial image, when both partial images include the partial handwritings which are coincident to one another.

12. A handwriting reproducing method which reproduces the handwriting of a writing device means which records handwriting on a surface of a medium with a writing section, takes a cell which comprises a fixed number of picture elements representing an image of a vicinal region of said writing section with an image-pickup means thereof in a time sequential manner following a movement of said writing section which image-pickup means is housed within a main body of said writing device means, and stores the small images sequentially, said method comprising the steps of;

reading out the cells sequentially, comparing a just read out cell with a previously read out cell, judging whether or not both cells include partial handwritings which are coincident to one another, overlapping the just read out cell to the previously read out cell in a condition that a partial handwriting in the just read out cell is exactly overlapped to a partial handwriting in the previously read out cell, so as to obtain a new image and to determine the new image as the previously read out cell, when both cells include the partial handwritings which are coincident to one another, repeating the overlapping at every reading out of a cell so as to reproduce a new image which is larger than the cell, when it is judged that both cells include partial handwritings which are coincident to one another, determining the new image as an act when it is judged that both cells do not include partial handwritings which are coincident to one another, overlapping the just read out cell to another previously read out cell in a condition that a partial handwriting in the just read out cell is exactly overlapped to a partial handwriting in the previously read out cell, so as to obtain another new image and to determine the another new image as the another previously read out cell, when both cells include partial handwritings which are coincident to one another, repeating the second overlapping at every reading out of a cell so as to reproduce another new image which is larger than the cell, after it has judged that both cells do not include partial handwritings which are coincident to one another, determining the another new image as another act when it is judged that both cells do not include partial handwritings which are coincident to one another, comparing one of the acts with another act, judging whether or not both acts include partial handwritings which are coincident to one another, and overlapping the one of the acts to the another act in a condition that a partial handwriting in the one of the acts is exactly overlapped to a partial handwriting in the another act, so as to obtain a larger image and to determine the larger image as a scene, when both acts include the partial handwritings which are coincident to one another.

13. A handwriting reproducing method as set forth in claim 12, wherein it is judged whether or not the just read out cell and the previously read out cell include partial handwritings which are coincident to one another, by moving the just read out cell upward, downward, rightward or leftward within an extent of one M-th (where M is a real number and is equal or greater than 1) of width and height of the just read out cell so as to obtain correlation between the both cells.

14. A handwriting reproducing method as set forth in claim 12, wherein it is judged whether or not the one of the acts and the another act include partial handwritings which are coincident to one another, by moving the one of the acts upward, downward, rightward or leftward within an extent of one N-th (where N is a real number and is equal or greater than 1) of width and height of the one of the acts so as to obtain correlation between the both acts.

* * * * *